United States Patent
Mian et al.

(10) Patent No.: US 7,355,508 B2
(45) Date of Patent: Apr. 8, 2008

(54) SYSTEM AND METHOD FOR MONITORING AN AREA

(75) Inventors: Zahid F. Mian, Loudonville, NY (US); Ryk E. Spoor, Troy, NY (US); Ronald W. Gamache, East Greenbush, NY (US)

(73) Assignee: International Electronic Machines Corp., Albany, NY (US)

( * ) Notice: Subject to any disclaimer, the term of this patent is extended or adjusted under 35 U.S.C. 154(b) by 299 days.

(21) Appl. No.: 11/003,039

(22) Filed: Dec. 3, 2004

(65) Prior Publication Data

US 2005/0258943 A1 Nov. 24, 2005

Related U.S. Application Data

(60) Provisional application No. 60/572,756, filed on May 21, 2004.

(51) Int. Cl.
 *B60Q 25/10* (2006.01)
(52) U.S. Cl. .............. 340/426.1; 340/425.5; 340/426.24; 340/438; 340/539.22
(58) Field of Classification Search ............ 340/426.1, 340/425.5, 426.18, 426.24, 426.26, 438, 340/541, 565, 539.22
See application file for complete search history.

(56) References Cited

U.S. PATENT DOCUMENTS

| | | | |
|---|---|---|---|
| 4,630,110 A | 12/1986 | Cotton et al. | |
| 4,797,657 A * | 1/1989 | Vorzimmer et al. | ......... 340/541 |
| 4,816,829 A | 3/1989 | Podolak et al. | |
| 5,283,643 A | 2/1994 | Fujimoto | |
| 5,508,736 A | 4/1996 | Cooper | |
| 5,570,127 A | 10/1996 | Schmidt | |
| 5,742,336 A | 4/1998 | Lee | |
| 5,883,586 A | 3/1999 | Tran et al. | |
| 6,078,253 A * | 6/2000 | Fowler | ......... 340/501 |
| 6,474,599 B1 * | 11/2002 | Stomski | ......... 244/118.5 |
| 6,507,779 B2 * | 1/2003 | Breed et al. | ......... 701/45 |
| 6,580,450 B1 | 6/2003 | Kersting et al. | |
| 6,771,186 B1 * | 8/2004 | Boveja et al. | ......... 340/945 |
| 6,793,179 B2 * | 9/2004 | Daniels | ......... 244/118.5 |
| 6,844,817 B2 * | 1/2005 | Gleine | ......... 340/574 |
| 6,972,694 B2 * | 12/2005 | Carroll | ......... 340/963 |
| 7,044,371 B2 * | 5/2006 | Dove et al. | ......... 235/384 |
| 2003/0058112 A1 * | 3/2003 | Gleine | ......... 340/573.1 |

OTHER PUBLICATIONS

Knudsen, "Auditory and Visual Maps of Space in the Optic Tectum of the Owl," Journal of Neuroscience, vol. 2, No. 9, pp. 1177-1194, Sep. 1982.

(Continued)

*Primary Examiner*—Toan N. Pham
(74) *Attorney, Agent, or Firm*—Hoffman, Warnick & D'Alessandro, LLC

(57) ABSTRACT

An improved system for monitoring an area, and in particular a public area such as a passenger area of a vehicle. Various types of sensing devices and analysis solutions are incorporated and the results combined to enable the monitoring system to operate in an intelligent manner. To this extent, the monitoring system can monitor and confirm the identification of individuals as well as numerous events that may occur within the monitored area. Further, the invention can determine one or more actions to be taken in response to an event, and perform the action(s) automatically without intervention from a user. As a result, the invention provides a solution that can autonomously monitor an area, requiring minimal oversight from a user.

43 Claims, 14 Drawing Sheets

OTHER PUBLICATIONS

Knudsen et al., "Creating a Unified Representation of Visual and Auditory Space in the Brain," Annual Review of Neuroscience, vol. 18, pp. 19-43, 1995.
Knudsen et al., "Computational Maps in the Brain," Annual Review of Neuroscience, vol. 10, pp. 41-65, 1987.
Knudsen et al., "Mechanisms of Sound Localization in the Barn Owl," Journal of Comparative Physiology, vol. 133, pp. 13-21, 1979.
Waibel et al., "Multimodal Interfaces," Artificial Intelligence Review, vol. 10, pp. 299-319 (also numbered 145-165), Aug. 1996 (missing pp. 308-309).
Eleftheriadis et al., "Automatic Face Location Detection for Model-Assisted Rate Control in H.261—Compatible Coding of Video," Signal Processing: Image Communications, vol. 7, pp. 435-455, Nov. 1995.
Rowley et al., "Neural Network-Based Face Detection," Proceedings of the 1996 Conference on Computer Vision and Pattern Recognition, pp. 203-208, San Francisco, CA, 1996.
Hunke et al., "Face Locating and Tracking for Human-Computer Interaction," Twenty-Eight Asilomar Conference on Signals, Systems, and Computers, Monterey, CA, Nov. 1995.
Dai et al, "Face-Texture Model Based on SGLD and its Application in Face Detection in a Color Scene," Pattern Recognition, vol. 29, No. 6, pp. 1007-1017, Jun. 1996.
Chen et al., "Face Detection by Fuzzy Pattern Matching," Proceedings of the Fifth International Conference on Computer Vision, pp. 591-596, 1995.
Colmenarez et al., "Frontal View Face Detection," Proceedings of the SPIE, vol. 2501, No. 1, pp. 90-98, 1995.
Lee et al., "A Visual Interaction System Using Real-Time Face Tracking," Proceedings of the 28th Asilomar Conference on Signals, Systems and Computers, vol. 2, pp. 1282-1286, 1995.
Darrell et al., "Active Face Tracking and Pose Estimation in an Interactive Room," Proceedings of the 1996 Conference on Computer Vision and Pattern Recognition, pp. 67-72, 1996.
Goodridge et al., "Multimedia Sensor Fusion for Intelligent Camera Control," Proceedings of the 1996 IEEE/SICE/RSJ International Conference on Multisensor Fusion and Integration for Intelligent Systems, pp. 655-662, Dec. 1996.
Lawrence et al., "Convolutional Neural Networks for Face Recognition," Proceedings of the 1996 Conference on Computer Vision and Pattern Recognition, pp. 217-222, 1996.
W. Konen, "Neural Information Processing in Real-World Face Recognition Applications," IEEE Expert, vol. 11, No. 4, pp. 7-8, Aug. 1996.
Moghaddam et al., "Bayesian Face Recognition Using Deformable Intensity Surfaces," Proceedings of the 1996 Conference on Computer Vision and Pattern Recognition, pp. 638-645, 1996.
Pentland et al., "View-Based and Modular Eigenspaces for Face Recognition," Proceedings of the IEEE Conference on Computer Vision and Pattern Recognition, pp. 84-91, Jun. 1994.
Ham et al., "Fuzzy-Based Recognition of Human Front Faces Using the Trapezoidal Membership Function," Proceedings of the 1995 IEEE International Conference on Fuzzy Systems, vol. 4, pp. 1799-1806, 1995.
M. Kuperstein, "Face Recognition: the Oldest Way to Verify ID is Now the Newest," Defense and Security Electronics, vol. 28, No. 3, pp. 30-31, Mar. 1996.
Chellappa et al., "Human and Machine Recognition of Faces: A Survey" & Prolog, Proceedings of the IEEE, vol. 83, No. 5, pp. 704-740, May 1995.
Yacoob et al., "Recognizing Human Facial Expressions from Long Image Sequences Using Optical Flow," IEEE Transactions on Pattern Analysis and Machine Intelligence, vol. 18, No. 6, pp. 636-642, Jun. 1996.
Essa et al., "Facial Expression Recognition using a Dynamic Model and Motion Energy," Proceedings of the Fifth International Conference on Computer Vision, pp. 360-367, 1995.
Duchnowski et al., "Toward Movement-Invariant Automatic Lip-Reading and Speech Recognition," Proceedings of the International Conference on Acoustics, Speech, and Signal Processing, vol. 1, pp. 109-112 (pp. 1-4 in copy provided), 1995.
Mak et al., "Lip-Motion Analysis for Speech Segmentation in Noise," Speech Communication, vol. 14, No. 3, pp. 279-296, Jun. 1994.
A. Pentland, "Smart Rooms," Scientific American, pp. 68-76, Apr. 1996.
Wren et al., "Pfinder: Real-Time Tracking of the Human Body," IEEE Transactions on Pattern Analysis and Machine Intelligence, vol. 19, No. 7, pp. 780-785 (pp. 1-7 in copy provided), Jul. 1997.
Maes et al., "The ALIVE System: Wireless, Full-Body Interaction with Autonomous Agents," Proceedings of Computer Animation '95, pp. 1-17, 1995 (best available copy).
Rander et al., "Recovery of Dynamic Scene Structure from Multiple Image Sequences," Proceedings of the 1996 Int'l Conference on Multisensor Fusion and Integration for Intelligent Systems, pp. 305-312, Dec. 1996.
Rao et al., "A Fully Decentralized Multi-Sensor System for Tracking and Surveillance," International Journal of Robotics Research, vol. 12, No. 1, pp. 20-44, Feb. 1993.
Murray et al., "Motion Tracking with an Active Camera," IEEE Transactions on Pattern Analysis and Machine Intelligence, vol. 16, No. 5, pp. 449-459, May 1994.
Watanabe et al., "Real-Time Gesture Recognition Using Maskable Template Model," Proceedings of the 1996 International Conference on Multimedia Computing and Systems, pp. 341-348, 1996.
Jo et al., "Vision-Based Human Interface System with World-Fixed and Human-Centered Frames Using Multiple View Invariance," IEICE Transactions Information and Systems, vol. E79-D, No. 6, pp. 799-808, Jun. 1996.
Wilson et al., "Learning Visual Behavior for Gesture Analysis," Proceedings of the 1995 IEEE International Conference on Computer Vision, pp. 229-234, 1995.
Wuu et al., "On Time Delay Estimation Involving Received Signals," IEEE Transactions on Acoustics, Speech, and Signal Processing, vol. ASSP-32, No. 4, pp. 828-835, Aug. 1984.
Knapp et al., "The Generalized Correlation Method for Estimation of Time Delay," IEEE Transactions on Acoustics, Speech, and Signal Processing, vol. ASSP-24, No. 4, pp. 320-327, Aug. 1976.
Chan et al., "The Least Squares Estimation of Time Delay and Its Use in Signal Detection," IEEE Transactions on Acoustics, Speech, and Signal Processing, vol. ASSP-26, No. 3, pp. 217-222, Jun. 1978.
Brandstein et al., "A Practical Time-Delay Estimator for Localizing Speech Sources with a Microphone Array," Computer Speech and Language, vol. 9, pp. 153-169, 1995.
K.D. Martin, "Estimating Azimuth and Elevation from Interaural Differences," On-line downloadable publication, MIT Media Lab, E15-401, Cambridge, MA, pp. 1-4, 1995.
R.E. Irie, "Robust Sound Localization: An Application of an Auditory Perception System for a Humanoid Robot," Department of Electrical Engineering and Computer Science, Massachusetts Institute of Technology, pp. 1-72, Jun. 1995.
Huang et al., "A Biomimetic System For Localization and Separation of Multiple Sound Sources," IEEE Transactions on Instrumentation and Measurement, vol. 44, No. 3, pp. 733-738, Jun. 1995.
Bub et al., "Knowing Who to Listen to in Speech Recognition: Visually Guided Beamforming," 1995 IEEE International Conference on Acoustics, Speech, and Signal Processing, May 9-12, 1995, Detroit, MI, vol. 1, pp. 848-851, 1995.
Takahashi et al., "Audio-Visual Sensor Fusion System for Intelligent Sound Sensing," Proceedings of the 1994 IEEE International Conference on Multisensor Fusion and Integration for Intelligent Systems, Las Vegas, NV, pp. 493-500, Oct. 2-5, 1994.
Lou et al., "Data Fusion and Sensor Integration: State-of-the-Art 1990s," Data Fusion in Robotics and Machine Intelligence, M.A. Abidi and R. C. Gonzalez, eds., Academic Press, Inc., pp. 7-135, 1992.
Lee et al., "Multi-Spectral Tissue Classification of MR Images Using Sensor Fusion Approaches," SPIE Medical Imaging IV: Image Processing, vol. 1233, pp. 149-157, 1990.
R. H. Lee, "Multi-Sensor Image Segmentation Algorithms," SPIE Sensor Fusion III, vol. 1306, pp. 11-17, 1990.

A. Elfes, "Multi-Source Spatial Data Fusion Using Bayesian Reasoning," Data Fusion in Robotics and Machine Intelligence, M. A. Abidi and R. C. Gonzalez, eds., Academic Press, Inc., pp. 137-163, 1992.

Hughes et al., "Ultrasonic Robot Localization Using Dempster-Shafer Theory," SPIE Neural and Stochastic methods in Image and Signal Processing, vol. 1766, pp. 2-11, 1992.

G. Duane, "Pixel-Level Sensor Fusion for Improved Object Recognition," SPIE Sensor Fusion, vol. 931, pp. 180-185, 1988.

M. Beckerman, "A Bayes-Maximum Entropy Method for Multi-Sensor Data Fusion," Proceedings of the 1992 IEEE International Conference on Robotics and Automation, vol. 2, pp. 1668-1674, 1992.

Richardson et al., "Fusion of Multisensor Data," Multisensor Integration and Fusion for Intelligent Machines and Systems, Ablex Publishing Corporation, Norwood, NJ, pp. 183-216, 1995.

Wallner et al., "Real-Time Map Refinement by Use of Sonar and Active Stereo-Vision," Robotics and Autonomous Systems, vol. 16, pp. 47-56, 1995.

I. J. Cox, "Blanche—An Experiment in Guidance and Navigation of an Autonomous Robot Vehicle," IEEE Transactions on Robotics and Automation, vol. 7, No. 2, pp. 193-204, Apr. 1991.

Abdulghafour et al., "Data Fusion Through Non-Deterministic Approaches—A Compariosn," SPIE Sensor Fusion VI, vol. 2059, pp. 37-53, 1993.

T. J. Broida, "Feature Correspondence in Multiple Sensor Data Fusion," SPIE Sensor Fusion III: 3-D Perception and Recognition, vol. 1383, pp. 635-651, 1990.

L. A. Zadeh, "Fuzzy Sets," Information and Control, No. 8, pp. 338-353, Jun. 1965.

E. Charniak, "The Bayesian Basis of Common Sense Medical Diagnosis," Proceedings of the National Conference on Artificial Intelligence, Washington, DC, pp. 70-73, 1983.

R. A. Brooks, "A Robust Layered Control System for a Mobile Robot," IEEE Journal of Robotics and Automation, vol. RA-2, No. 1, pp. 14-23, Mar. 1986.

R. A. Brooks, "Intelligence without Representation," Artificial Intelligence, vol. 47, pp. 139-159, 1991.

R. C. Arkin, "Integrating Behavioral, Perceptual, and World Knowledge in Reactive Navigation," Robotics and Autonomous Systems, vol. 6, pp. 105-122, 1990.

Pin et al., "Using Custom-Designed VLSI Fuzzy Inferencing Chips for the Autonomous Navigation of a Mobile Robot," Proceedings of the 1992 IEEE/RSJ International Conference on Intelligent Robots and Systems, Raleigh, North Carolina, pp. 790-795, Jul. 7-10, 1992.

Goodridge et al., "Fuzzy Behavior Fusion for Reactive Control of an Autonomous Mobile Robot: MARGE," Proceedings of the 1994 IEEE International Conference on Robotics and Automation, vol. 2, pp. 1622-1627, May 1994.

Goodridge et al., "Multi-Layered Fuzzy Behavior Fusion for Real-Time Control of Systems with Many Sensors," Proceedings of the 1994 IEEE International Conference on Multisensor Fusion and Integration for Intelligent Systems, Las Vegas, NV, pp. 272-279, Oct. 2-5, 1994.

Nourbakhsh et al., "The Winning Robots from the 1993 Robot Competition," AI Magazine, vol. 14, No. 4, pp. 51-62, Winter 1993.

G. J. Klir, "Developments in Uncertainty-Based Information," Advances in Computers, vol. 36, Academic Press, Inc., pp. 255-332, 1993 (missing p. 265).

P. Cheeseman, "In Defense of Probability," Proceedings of the International Conference on Artificial Intelligence, pp. 1002-1009, 1985.

A. P. Dempster, "Upper and Lower Probabilities Induced by a Multi-Valued Mapping," The Annals of Mathematical Statisitics, vol. 38, No. 2, 325-339, 1967.

Gordon et al., "The Dempster-Shafer Theory of Evidence," Readings in Uncertain Reasoning, Morgan Kaufmann Publishing Co., Menlo Park, CA, pp. 529-539, 1990.

R. Stein, "The Dempster-Shafer Theory of Evidential Reasoning," AI Exper, vol. 8, No. 8, pp. 26-31, Aug. 1993.

Hutchinson et al., "Multisensor Strategies Using Dempster-Shafer Belief Accumulation," Data Fusion in Robotics and Machine Intelligence, M. A. Abidi and R. C. Gonzalez, eds., pp. 165-209, 1992.

Gibson et al., "An Autonomous Fuzzy Logic Architecture for Multisensor Data Fusion," Proceedings of the 1994 IEEE International Conference on Multisensor Fusion and Integration for Intelligent Systems, Las Vegas, NV, pp. 143-150, Oct. 2-5, 1994.

Sugeno et al., "Fuzzy Algorithmic Control of a Model Car by Oral Instructions," Fuzzy Sets and Systems, No. 32, pp. 207-219, Sep. 1989 (missing p. 219).

Yost et al., "Properties of Sound Localization by Humans," Neurobiology of Hearing: The Central Auditory System, R. A. Altschuler, et al., editors, Raven Press, Ltd., New York, pp. 389-410, 1991.

P. M. Zurek, "The Precedence Effect and Its Possible Role in the Avoidance of Interaural Ambiguities," Journal of the Acoustical Society of America, vol. 67, No. 3, pp. 952-964, Mar. 1980.

C. E. Carr, "Delay Line Models of Sound Localization in the Barn Owl," American Zoologist, vol. 33, pp. 79-85, 1993.

Weinstein et al., "Fundamental Limitations in Passive Time-Delay Estimation—Part II: Wide-Band Systems," IEEE Transactions on Acoustics, Speech, and Signal Processing, vol. ASSP-32, No. 5, pp. 1064-1078, Oct. 1984.

Huang et al., "Motion and Pose Determination Using Algebraic Methods," Time-Varying Image Processing and Moving Object Recognition, 2—edited by V. Cappellini, Elsevier Science Publishers B.V., pp. 243-249, 1990.

Nichols et al., "Reliable Motion Detection of Small Targets in Video with Low Signal-to-Clutter Ratios," Proceedings of the SPIE: Signal and Data Processing of Small Targets, vol. 2561, pp. 168-177, 1995.

Yang et al., "A Real-Time Face Tracker," Proceedings of the Third IEEE Workshop on Applications of Computer Vision, WACV '96, Sarasota, Florida, pp. 142-147, 1996.

Yoo et al., "A Method for Real-Time Face Region Tracking Based on Color Histogram," Proceedings of the SPIE Acquisition, Tracking, and Pointing X, Orlando, Florida, vol. 2739, pp. 361-365, Apr. 1996.

Swain et al., "Color Indexing," International Journal of Computer Vision, vol. 7, No. 1, pp. 11-32, 1991.

Pattipati et al., "Passive Multisensor Data Association Using a New Relaxation Algorithm," Multitarget-Multisensor Tracking: Advanced Applications, Artech House, Norwood, MA, pp. 219-246, 1990.

O. E. Drummond, "Multiple Sensor Tracking with Multiple Frame, Probabilistic Data Association," Proceedings of the SPIE: Signal and Data Processing of Small Targets, vol. 2561, pp. 322-336, 1995.

S. Deb et al., "Assignment Algorithms for the Passive Sensor Data Association Problem," Proceedings of the SPIE: Signal and Data Processing of Small Targets, vol. 1096, pp. 231-243, 1989.

Romine et al., "Fusion of Radar and Imaging Sensor Data for Target Tracking," Proceedings of the SPIE: Signal and Data Processing of Small Targets, vol. 2235, pp. 558-569, 1994.

Rao et al., "A Fully Decentralized Multi-Sensor System for Tracking and Surveillance," International Journal of Robotics Research, vol. 12, No. 1, pp. 20-44, 1993.

Abbott, et al., "Promising Directions in Active Vision," International Journal of Computer Vision, vol. 11, No. 2, pp. 109-126, 1993.

A. J. Sellen, "Speech Patterns in Video-Mediated Conversations," Proceedings of the ACM Conference on Human Factors in Computing Systems; Striking a Balance; CHI '92, Monterey, California, pp. 49-59, May 3-7, 1992.

Canavesio et al., "Strategies for Automated Camera Switching Versus Behavioural Patterns in Videoconferencing," Proceedings of the IEEE Global Telecommunications Conference, Atlanta, GA, pp. 313-318, Nov. 1984.

D. Sink, "Machine Vision Setting New Standards in Remote Surveillance," Defense & Security Electronics, vol. 28, No. 3, pp. 26-27, Mar. 1996.

* cited by examiner

SYSTEM AND METHOD FOR MONITORING AN AREA

REFERENCE TO PRIOR APPLICATION

The current application claims the benefit of co-pending U.S. Provisional Application No. 60/572,756, filed on May 21, 2004 and entitled "System and Method for Providing Effective Security Monitoring Using Smart Sensor Fusion," which is hereby incorporated herein by reference.

GOVERNMENT LICENSE RIGHTS

The U.S. Government has a paid-up license in this invention and the right in limited circumstances to require the patent owner to license others on reasonable terms as provided for by the terms of Contract Number NNL04AB09P awarded by the National Aeronautics and Space Administration.

BACKGROUND OF THE INVENTION

1. Technical Field

The invention relates generally to monitoring areas (e.g., section of an enclosure, geographic location, portion of street, etc.), and in one embodiment, to an improved solution for monitoring a vehicle such as an airplane or other public/private area such as an airport.

2. Background Art

Increasingly, it is desired to provide effective monitoring of public transportation systems and other public areas (e.g., airport terminal, stadium, mall, etc.). In particular, the increased sensitivity to the ever-present threat of terrorism has created a desire for improved solutions for identifying and/or responding to these threats when they occur. Further, the ability to readily prosecute smaller disruptions (e.g., argumentative passenger on a flight), and identify the cause(s) of an accident are also desirable for public transportation systems, and in particular, aircraft.

In response to these needs, several solutions have been proposed. Typically, these solutions incorporate one or more cameras that provide a user the ability to monitor a public area. For example, for an airplane, numerous solutions provide one or more cameras that provide video of the passenger area to the cockpit (e.g., pilot) and/or a ground controller. However, these solutions have several deficiencies. For example, the requirement of multiple cameras leads to an increased weight of the airplane that is frequently prohibitive. Further, the "always on" nature of the video provides a constant distraction to an otherwise busy pilot/ground controller and/or makes the monitoring individual more prone to become inattentive to the video.

To this extent, many of the solutions do not provide any automated operation. For example, many of the solutions cannot automatically detect any events that occur within the monitored area. For those solutions that do attempt to automatically detect events, only a limited number of events can be detected, such as a gunshot and/or an individual approaching a restricted area. As a result, these solutions do not provide a sufficiently comprehensive ability to detect events.

Further, many solutions do not provide sufficient data for some uses. For example, many solutions provide only audio or video data. As a result, events tend to be incorrectly and/or under detected, and the data does not provide a sufficiently complete record for use in court or other analysis. Still further, many solutions require additional communications systems to enable the data to be transmitted from, for example, an aircraft, to an external location, such as the ground control. This adds additional complexity and weight to the aircraft, which adds to the cost of its operation and maintenance.

As a result, a need exists for an improved method and system for monitoring an area. In particular, a need exists for a solution that can operate independently from user oversight, can provide improved accuracy in detecting events by using multiple types of data and/or modes of operation, and/or can transmit data using one or more systems currently implemented in an aircraft.

SUMMARY OF THE INVENTION

The invention provides an improved solution for monitoring an area. Specifically, under the present invention, a monitoring system and method are provided that obtain various types of data (e.g., light, sound, attribute), implement various analysis solutions for the data and combine (fuse) the analyzed data to make highly reliable, complex decisions about the monitored area. To this extent, the invention can combine a plurality of identification solutions to reliably identify an individual, combine sound and light data to reliably detect events, etc. In response to one or more events, the monitoring system can further determine and/or implement one or more actions. For example, the monitoring system may initiate communications with a remote user and/or an emergency responder who can request one or more actions and/or take the appropriate action.

A first aspect of the invention provides a system for monitoring a vehicle, the system comprising: means for obtaining a first type of raw data for a passenger area of the vehicle; means for obtaining a second type of raw data for the passenger area; means for detecting an event based on at least one of the first type of raw data and the second type of raw data; and means for automatically determining an action based on the event.

A second aspect of the invention provides a method of monitoring a vehicle, the method comprising: obtaining a first type of raw data for a passenger area of the vehicle; obtaining a second type of raw data for the passenger area; detecting an event based on at least one of the first type of raw data and the second type of raw data; and automatically determining an action based on the event.

A third aspect of the invention provides a system for monitoring an area, the system comprising: means for obtaining a first type of raw data for the area; means for obtaining a second type of raw data for the area; means for generating adjusted data based on the first type of raw data and the second type of raw data, wherein the adjusted data includes at least some of the first type of raw data and at least some of the second type of raw data; and means for detecting an event based on the adjusted data.

A fourth aspect of the invention provides a method of monitoring an area, the method comprising: obtaining a first type of raw data for the area; obtaining a second type of raw data for the area; generating adjusted data based on the first type of raw data and the second type of raw data, wherein the adjusted data includes at least some of the first type of raw data and at least some of the second type of raw data; and detecting an event based on the adjusted data.

A fifth aspect of the invention provides a system for monitoring an area, the system comprising: means for obtaining raw data for the area; means for generating object data for an individual in the area based on the raw data; means for applying a first identification solution to the object data to determine a first preliminary identification of the individual; means for applying a second identification solution to the object data to determine a second preliminary identification of the individual; and means for fusing the first and second preliminary identifications to identify the individual.

A sixth aspect of the invention provides a method of monitoring a vehicle, the method comprising: obtaining raw data for the area; generating object data for an individual in the area based on the raw data; applying a first identification solution to the object data to determine a first preliminary identification of the individual; applying a second identification solution to the object data to determine a second preliminary identification of the individual; and fusing the first and second preliminary identifications to identify the individual.

A seventh aspect of the invention provides a system for monitoring an area, the system comprising: means for obtaining a plurality of modes of operation for the system; means for setting one of the plurality of modes of operation as a current mode of operation for the system; means for obtaining raw data for the area; means for automatically detecting an event based on the raw data and the current mode of operation; and means for altering the current mode of operation based on the event.

An eighth aspect of the invention provides a method of monitoring a vehicle, the method comprising: obtaining a plurality of modes of operation for the system; setting one of the plurality of modes of operation as a current mode of operation for the system; obtaining raw data for the area; automatically detecting an event based on the raw data and the current mode of operation; and altering the current mode of operation based on the event.

A ninth aspect of the invention provides a system for monitoring an area, the system comprising: means for obtaining raw data for the area, wherein the raw data comprises a plurality of types of data; means for generating feature data based on the raw data; means for generating object data based on the feature data; and means for detecting an event based on at least one of the raw data, the feature data, and the object data.

A tenth aspect of the invention provides a method of monitoring an area, the method comprising: obtaining raw data for the area, wherein the raw data comprises a plurality of types of data; generating feature data based on the raw data; generating object data based on the feature data; and detecting an event based on at least one of the raw data, the feature data, and the object data.

The invention further provides computer program products stored on a computer-readable medium, which when executed, monitor an area, wherein each program product comprises program code for implementing the functionality for an aspect of the invention described herein.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, the invention provides an improved solution for monitoring an area. Specifically, under the present invention, a monitoring system and method are provided that obtain various types of data (e.g., light, sound, attribute), implement various analysis solutions for the data and combine (fuse) the analyzed data to make highly reliable, complex decisions about the monitored area. To this extent, the invention can combine a plurality of identification solutions to reliably identify an individual, combine sound and light data to reliably detect events, etc. In response to one or more events, the monitoring system can further determine and/or implement one or more actions. For example, the monitoring system may initiate communications with a remote user and/or an emergency responder who can request one or more actions and/or take the appropriate action.

Figure 1:
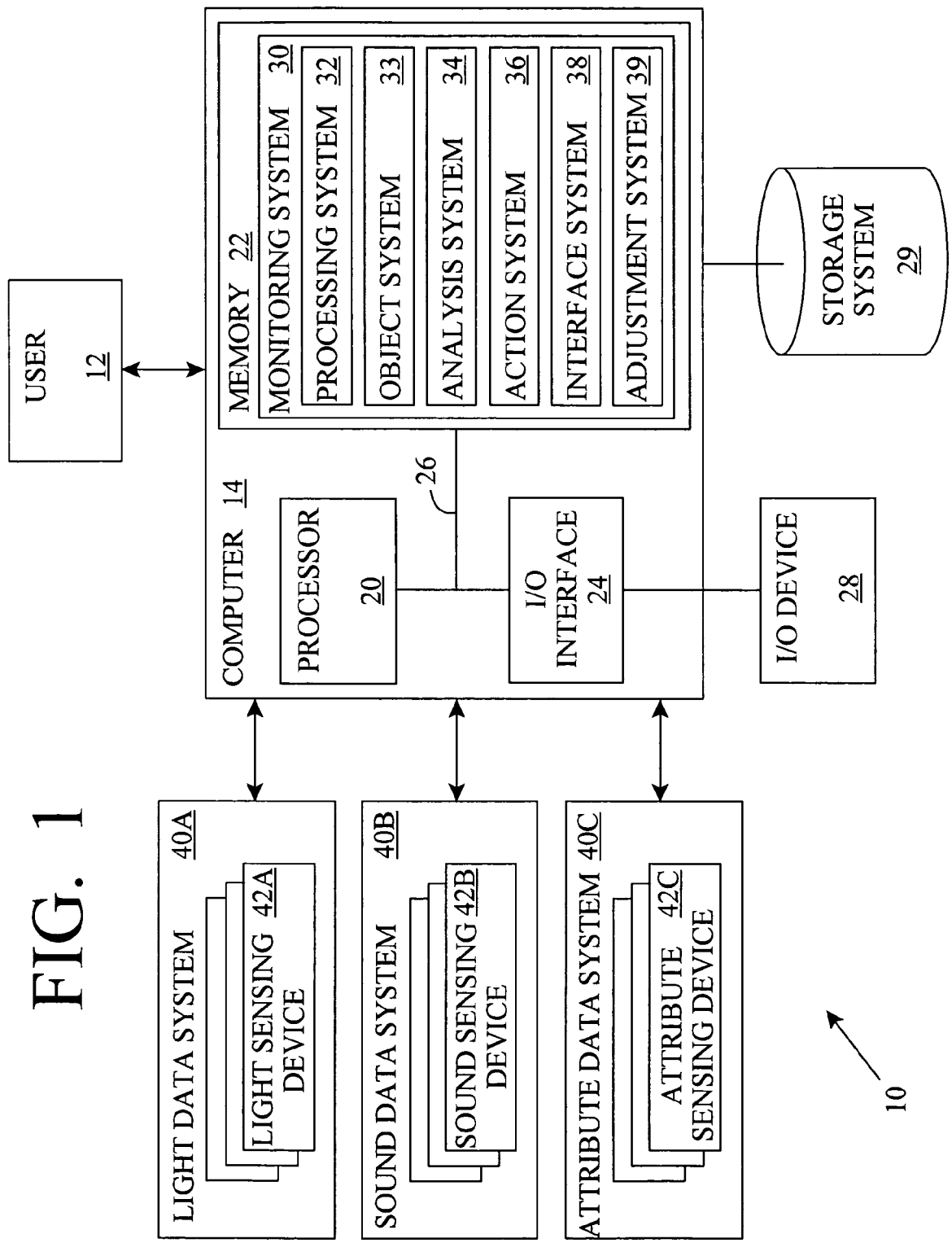
FIG. 1 shows an illustrative system for monitoring an area according to one embodiment of the invention.

Turning to the drawings, FIG. 1 shows an illustrative system 10 for monitoring an area according to one embodiment of the invention. In particular, system 10 is shown including a plurality of data systems 40A-C that each include one or more sensing devices 42A-C for obtaining raw data of a particular type, e.g., light, sound, and attribute, respectively, for the area. Any range of a particular data type can be obtained. For example, light data can comprise data having a frequency in one or more of the infrared, visible, ultraviolet, etc., range(s). Similarly, sound data can comprise data having a frequency below, within, and/or above the audible frequency range. Attribute data can comprise any other type of sensed data such as a temperature, a pressure, air quality/content, etc. When implemented on a vehicle or the like, attribute data can further include a speed, a geographic location, a pitch, an altitude, an acceleration, a stress/vibration at one or more locations, a direction of travel, a heading, a weight distribution, a landing gear status, a fuel level, etc. It is understood that the various data systems 40A-C, sensing devices 42A-C and corresponding types of data (light, sound, attribute) are only illustrative. To this extent, any combination of sensing devices and types of data, such as stress, microwave, radar, pressure, sonar, etc., can be incorporated into system 10. Regardless, each data system 40A-C communicates its raw data to computer 14 for processing by monitoring system 30. Based on the raw data, monitoring system 30 can detect an event, perform an action, and/or communicate data to a user 12.

To this extent, monitoring system 30 is shown implemented on computer 14 as computer program code. However, it is understood that some or all of the functionality described for monitoring system 30 could be implemented as hardware and/or firmware. In any event, computer 14 can comprise any type of computing device. For example, computer 14 is shown including a processor 20, a memory 22, an input/output (I/O) interface 24, and a bus 26. Further, computer 14 is shown in communication with an external I/O device/resource 28 and a storage system 29. In general, processor 20 executes computer program code such as monitoring system 30, that is stored in memory 22 and/or storage system 29. While executing computer program code (e.g., monitoring system 30), processor 20 can read and/or write data (e.g., light data received from light data system 40) to/from memory 22, storage system 29, and/or I/O interface 24. Bus 26 provides a communication link between each of the components in computer 14.

Computer 14 is only illustrative of various possible combinations of hardware. For example, processor 20 may comprise a single processing unit, or be distributed across one or more processing units in one or more locations, e.g., on a client and server. Similarly, memory 22 and/or storage system 29 can comprise any combination of various types of data storage and/or transmission media that reside at one or more physical locations. I/O interface 24 can comprise any system for exchanging information with one or more I/O devices 28 that provide an interface with one or more other computing devices (e.g., network adapter, I/O port, modem, etc.) and/or users 12 (e.g., keyboard, pointing device, display, etc.). It is understood, however, that if computer 14 comprises a handheld device or the like, one or more I/O devices 28 (e.g., a display) and/or storage system 29 could be contained within computer 14, not externally as shown.

As discussed above, computer 14 can send data to and receive data from data systems 40A-C and/or user 12. To this extent, data systems 40A-C could include one or more computing devices similar to computer 14. Similarly, user 12 could operate another computer device (not shown) that is in communication with computer 14. In either case, communications between data systems 40A-C and computer 14 can occur over one or more networks (not shown) that comprise any type of communications link. For example, the network can comprise an addressable connection in a client-server (or server-server) environment that may utilize any combination of wireline and/or wireless transmission methods. Further, the network can comprise any combination of various types of networks, including the Internet, a wide area network (WAN), a local area network (LAN), a virtual private network (VPN), etc. Regardless, connectivity and communications between the various computing devices can be implemented using any known protocol(s).

In any event, monitoring system 30 monitors an area by processing raw data received from data systems 40A-C. To this extent, monitoring system 30 is shown including a processing system 32 for obtaining and processing the raw data, an object system 33 for recognizing and/or tracking objects based on the raw data, an analysis system 34 for detecting events based on the objects, an action system 36 for determining an action to be performed in response to the events, an interface system 38 for interacting with one or more users 12 and/or other systems, and an adjustment system 39 for adjusting one or more aspects of the operation of monitoring system 30. Operation of each of these systems is described further below. However, it is understood that some of the various systems shown in FIG. 1 can be implemented independently, combined, and/or stored in memory for one or more separate computers 14 that communicate over a network. Further, it is understood that some of the systems and/or functionality may not be implemented, or additional systems and/or functionality may be included as part of system 10.

In one embodiment, monitoring system 30 can automatically detect one or more events. An "event" comprises any occurrence that is detected based on the raw data obtained for the area. To this extent, an event can comprise a particular noise (e.g., individual speaking, key word/phrase, gunshot, engine running, etc.), an action by an individual (e.g., placement of an item, departure from a seat, unauthorized location, etc.), a change in one or more attributes (e.g., change in heading, drop in air pressure, acceleration, etc.), an intersection of different objects, etc. Further, an event can comprise a compound event that is based on one or more previously detected events and/or a time since an event. For example, an event can comprise exceeding a threshold number of people in an area, an item left after unloading an aircraft, an elapsed time since an individual entered an area such as a bathroom, etc. Still further, an event can be detected based on a relative motion between two or more objects (e.g., punch, push, thrown object, etc.).

Monitoring system 30 can automatically detect an event based on some or all of the raw data for the area that is received from data systems 40A-C. In particular, the event can be detected by analyzing one type of data, for example, a gunshot can be detected based on sound data alone and/or by analyzing two or more types of data together, for example, an individual making threats can be detected by analyzing both physical gestures as well as volume and/or content of speech. By detecting and processing events, monitoring system 30 can reduce the transmission, interaction, and/or human oversight demands to successfully monitor an area. As a result, monitoring system 30 can provide a solution that effectively monitors an area without significantly increasing the burden on individuals that are already busy performing other duties or requiring the employment of additional individuals. To this extent, monitoring system 30 can require the attention of one or more individuals only when the detected event(s) indicate a potential problem in the monitored area.

In response to one or more detected events, monitoring system 30 can perform one or more actions. An "action" can comprise any operation performed by monitoring system 30. For example, an action can comprise initiating communications with another computing device. These communications can comprise providing commands to control the computing device, providing data for display by the computer device, storage of the data at a remote computing device, etc. Further, monitoring system 30 can perform other actions such as activating an I/O device to signal an alarm, initiating operation of/communications with another system, adjusting operation of a sensing device 42A-C, altering a mode of operation, etc.

Figure 2:
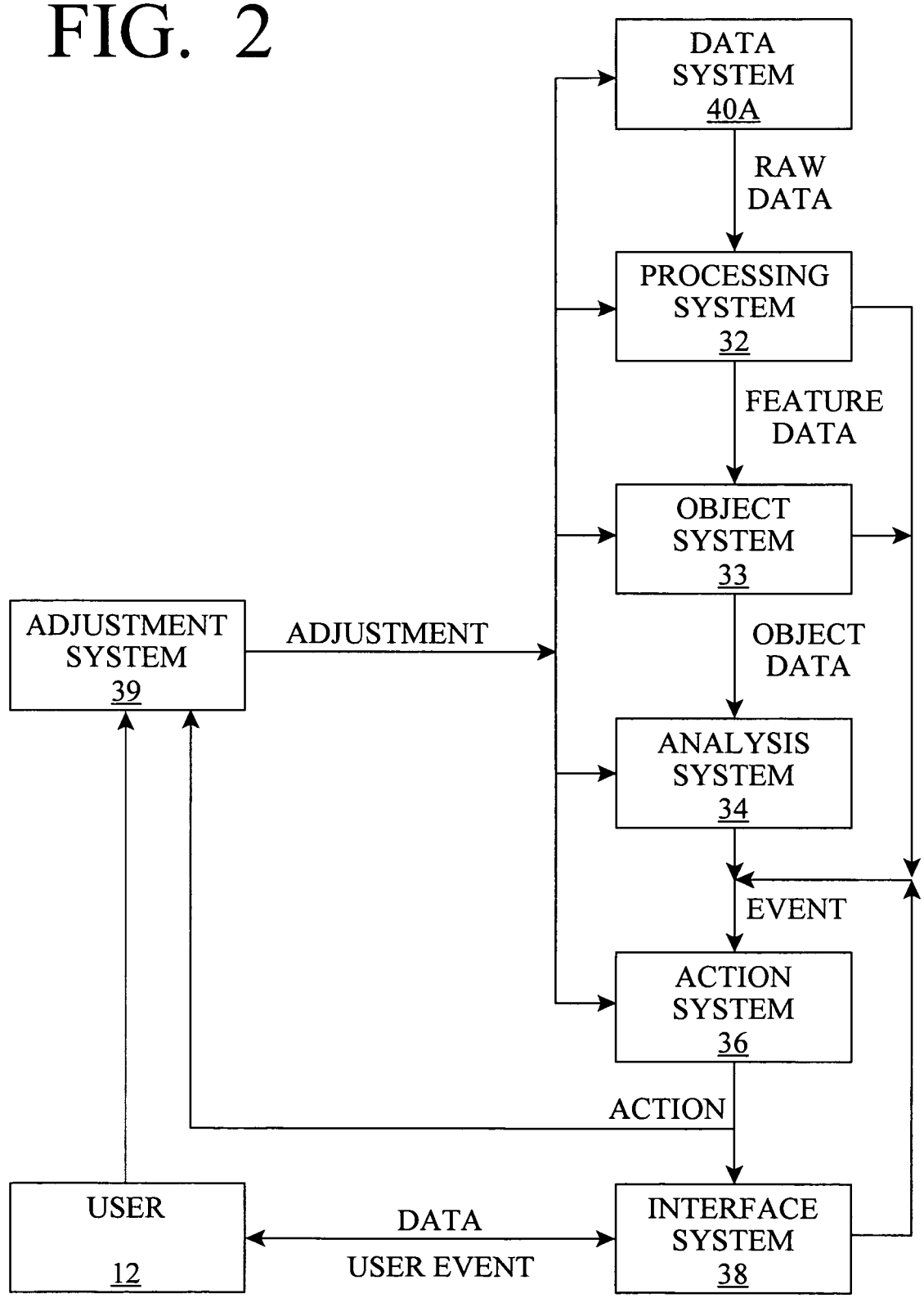
FIG. 2 shows an illustrative data flow diagram for the system shown in FIG. 1.

FIG. 2 shows an illustrative data flow between the various systems in system 10 (FIG. 1). In particular, data system 40A generates/obtains raw data for a monitored area that is provided to processing system 32. Based on the raw data, processing system 32 can detect one or more simple events (e.g., gunshot, movement in restricted area, etc.) and provide the event(s) to action system 36 for processing. Additionally, processing system 32 can perform one or more adjustments to the raw data (e.g., filtering, noise reduction, etc.) and generate "feature data" based on one or more identified features in the raw/adjusted data. Feature data can include, for example, data identifying an edge/outline in light data, a distinct sound in sound data, a rapid change in attribute data (e.g., altitude, pressure, etc.), and the like. In any event, the feature data is provided to object system 33, which can generate "object data" based on the recognition and/or tracking of one or more objects in the feature data. Object data includes data on one or mroe a unified signal phenomena, such as an animate or inanimate objects (e.g., a car, a person, a briefcase, etc.). Further, object system 33 may detect one or more events (e.g., a punch, an individual exiting an automobile, etc.) based on the object data, and provide the event(s) to action system 36 for processing. Regardless, the object data is provided to analysis system 34, which can detect more complex events based on the object data. For example, analysis system 34 can implement threshold analysis, one or more neural networks, etc., to detect an event, which is provided to action system 36 for processing.

Action system 36 determines zero or more actions to be performed in response to detected event(s). To this extent, action system 36 can fuse multiple events to determine a situation and incorporate a neurofuzzy expert system to determine an appropriate action. Further, action system 36 can store information on previously detected events and detect one or more additional events based on the previously detected events. One or more of the actions can be provided to interface system 38, which can automatically perform the action(s). Interface system interacts with user 12 and/or other systems (described below). For example, interface system 38 can communicate data to user 12. Additionally, interface system 38 can receive an event (e.g., button pushed) from user 12, and provide the event to action system 36 for processing. Adjustment system 39 allows user 12 to adjust the operation of one or more of the systems included in monitoring system 30 (FIG. 1). Further, adjustment system 39 can automatically make one or more adjustments based on analysis of the operation of the various systems.

Further details of the operation of each of the systems is discussed further below. However, it is understood that the illustrative data flow shown in FIG. 2, provides an overview of the general functioning of the various systems. To this extent, additional data flows can be provided between the various systems as will be described in more detail with respect to each system. These data flows have not been included in FIG. 2 for clarity purposes. Further, it is understood that the data discussed herein can be additive, and can include the data received as well as the generated data. For example, object data can include feature data and/or raw data and an event can comprise the corresponding object data, feature data, and/or raw data.

Figure 3:
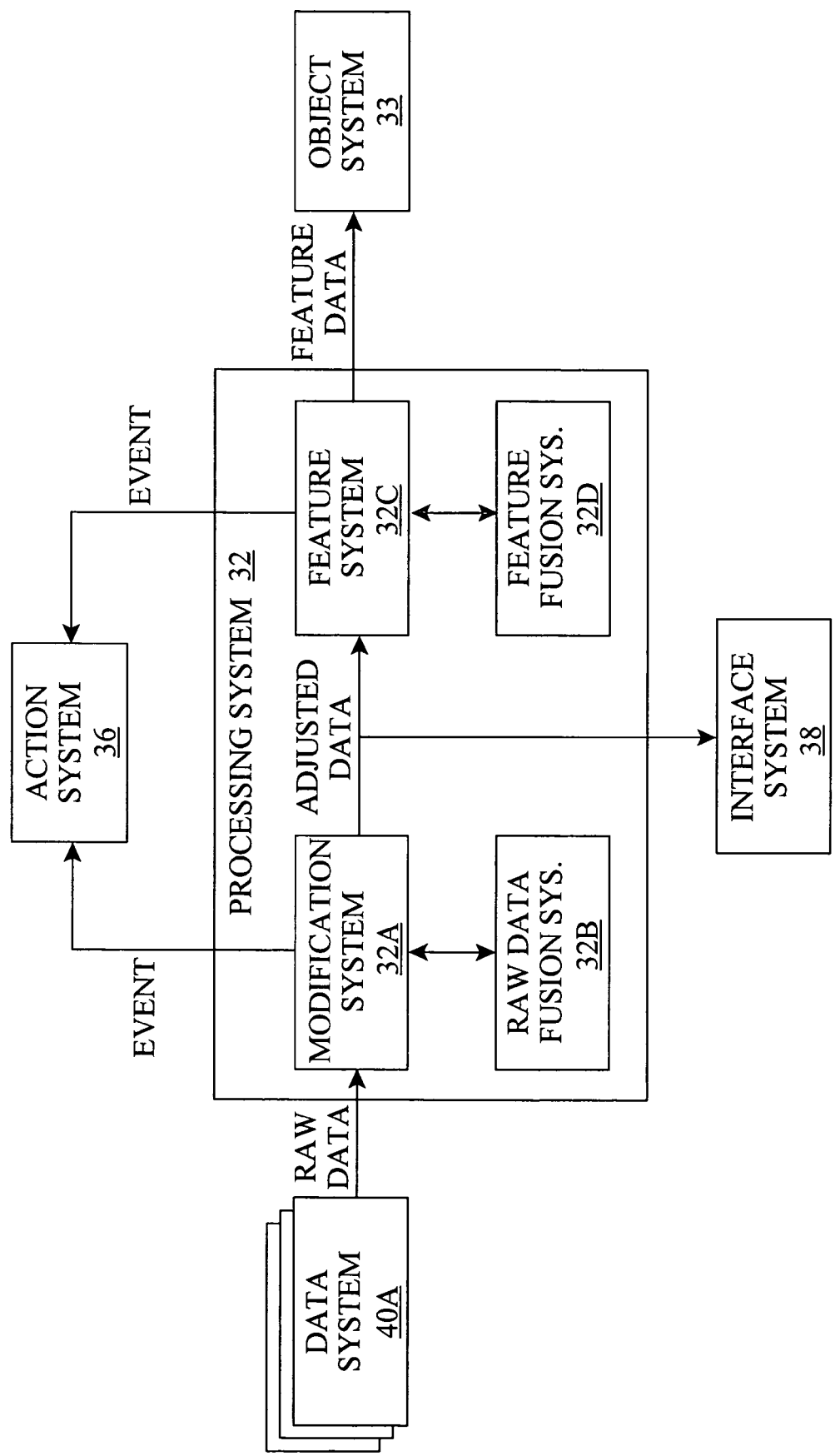
FIG. 3 shows an illustrative data flow diagram for one embodiment of the processing system shown in FIG. 1.

FIG. 3 shows an illustrative data flow diagram for one embodiment of processing system 32. As discussed above, one or more data systems, such as data system 40A, can provide raw data obtained for a monitored area to a modification system 32A in processing system 32. Modification system 32A can generate adjusted data by implementing one or more adjustments to the raw data. Any combination of various known adjustments can be made to the raw data. For example, when data system 40A is in a moving vehicle, raw data such as light data can be adversely effected by vibrations, changing light conditions, and the like. In this case, adjustments to the raw data can comprise filtering (highpass, low-pass, noise), thresholding, equalization, stabilization, etc. Similarly, raw data such as sound data can comprise background engine noise, chatter, and the like. As a result, the raw sound data can be adjusted using thresholding, cancellation of spurious or reflected signals, filtering for high and/or low bands, etc., as are known in the art.

In any event, the adjusted data comprises a data set that is suitable for further analysis. To this extent, raw data fusion system 32B can further process raw data and/or the adjusted data. In particular, raw data fusion system 32B can generate a simple fused data set based on the data. For example, raw data fusion system 32B can implement one or more of a weighted summation, mosaic construction, and the like, to generate the simple fused data set. To this extent, raw data fusion system 32B could comprise one or more current data analysis tools, such as Acadia™, by Pyramid Vision™.

Regardless, the adjusted data can comprise fused data that comprises a plurality of types of data. For example, raw data fusion system 32B can fuse light data, sound data, and/or attribute data that is obtained from data systems 40A-C (FIG. 1). The various types of data can be fused based on the time collected, an area from which the data was collected, etc. For example, visible light and infrared light for a monitored area can be combined to generate the adjusted data. In this case, the visible light data can be used to recognize an object within the monitored area (e.g., a car), while the infrared light data can be used to determine one or more attributes of the object (e.g., hot spots indicating recent use, presence of human, etc.). Similarly, fused light and sound data can be used to determine a source object for a particular sound. Various other possible applications are possible as will be recognized by one skilled in the art.

The adjusted data can then be provided to a feature system 32C, which automatically generates feature data based on the adjusted data. In particular, feature system 32C detects one or more features in the adjusted data and generates feature data based on the detected feature(s). For example, features in light data can include the edge/outline of objects, facial and other human-identifying features, motion of an object, intersection of multiple objects, signal attack/decay characteristics, and the like. To this extent, feature system 32C can use one or more edge/outline detectors, motion, signal attack/decay characteristics, etc., to generate feature data that includes a set of identified features. Further, a feature fusion system 32D can also process the adjusted data and/or feature data to generate a set of fused features. For example, multiple edges identified in light data which form a continuous edge can be fused into a single edge. For sound data, identifiable features can comprise the detection of sound data generated by a new sound generator, a distinct sound, a sound having a minimum decibel level, etc. To this extent, feature fusion system 32D can implement weighted summation, concatenation, etc., which generate fused features that are then incorporated into the feature data.

Figure 14:
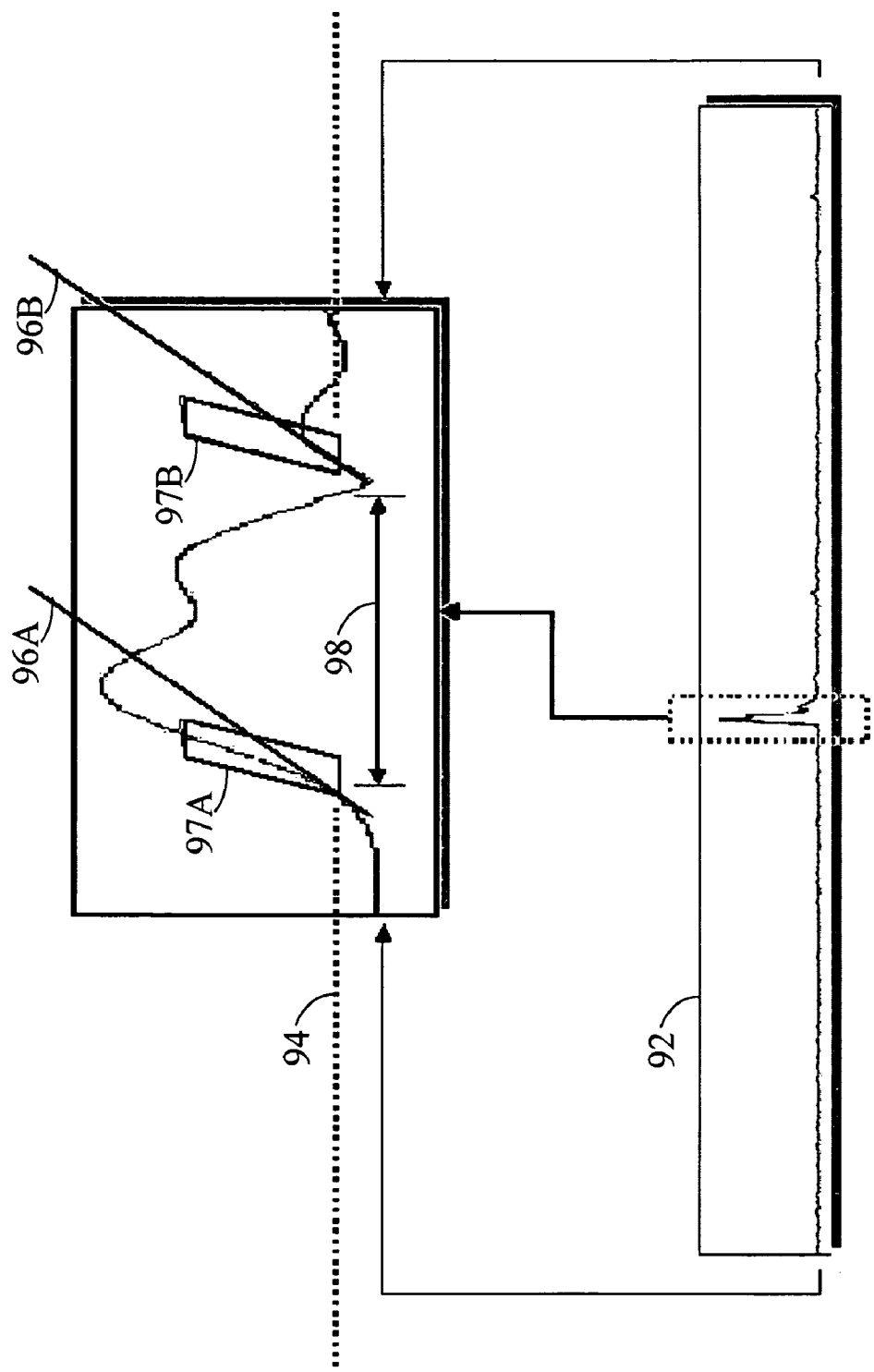
FIG. 14 illustrates event detection in sound data according to one embodiment of the invention.

During processing, one or more simple events may be detected by the various systems 32A-D within processing system 32. For example, modification system 32A could detect a sudden loss of pressure/altitude, and the like, while feature system 32C could detect a unique sound such as a gunshot, a shout, a key word/phrase, etc. For example, FIG. 14 illustrates event detection in sound data according to one embodiment of the invention. In particular, sound data 92 is analyzed to determine if the signal exceeds a detect level 94. Once exceeded, feature system 32C (FIG. 3) can examine one or more parameters of the signal such as a slope of attack 96A-B, a slope window 97A-B, a duration window 98, etc. Based on these parameters, one or more unique sounds such as a gunshot, a shout, a key word/phrase, etc., can be recognized. In particular, the measured parameters can be compared to the known characteristics of various sounds to determine if they are sufficiently similar. Returning to FIG. 3, when an event is detected, it can be provided to action system 36 for processing. Further, action system 36 may request that some/all of the adjusted data be provided to user 12 (FIG. 1) and/or an external system. In this case, the adjusted data also can be provided to interface system 38 for communication. To this extent, user 12 (FIG. 1) can be presented with fused data (e.g., visible light data and infrared light data) that can greatly enhance his/her ability to make an informed decision about the status of the monitored environment and/or an action to take in response to the status. Regardless, the feature data is provided to object system 33 for further analysis.

Figure 4:
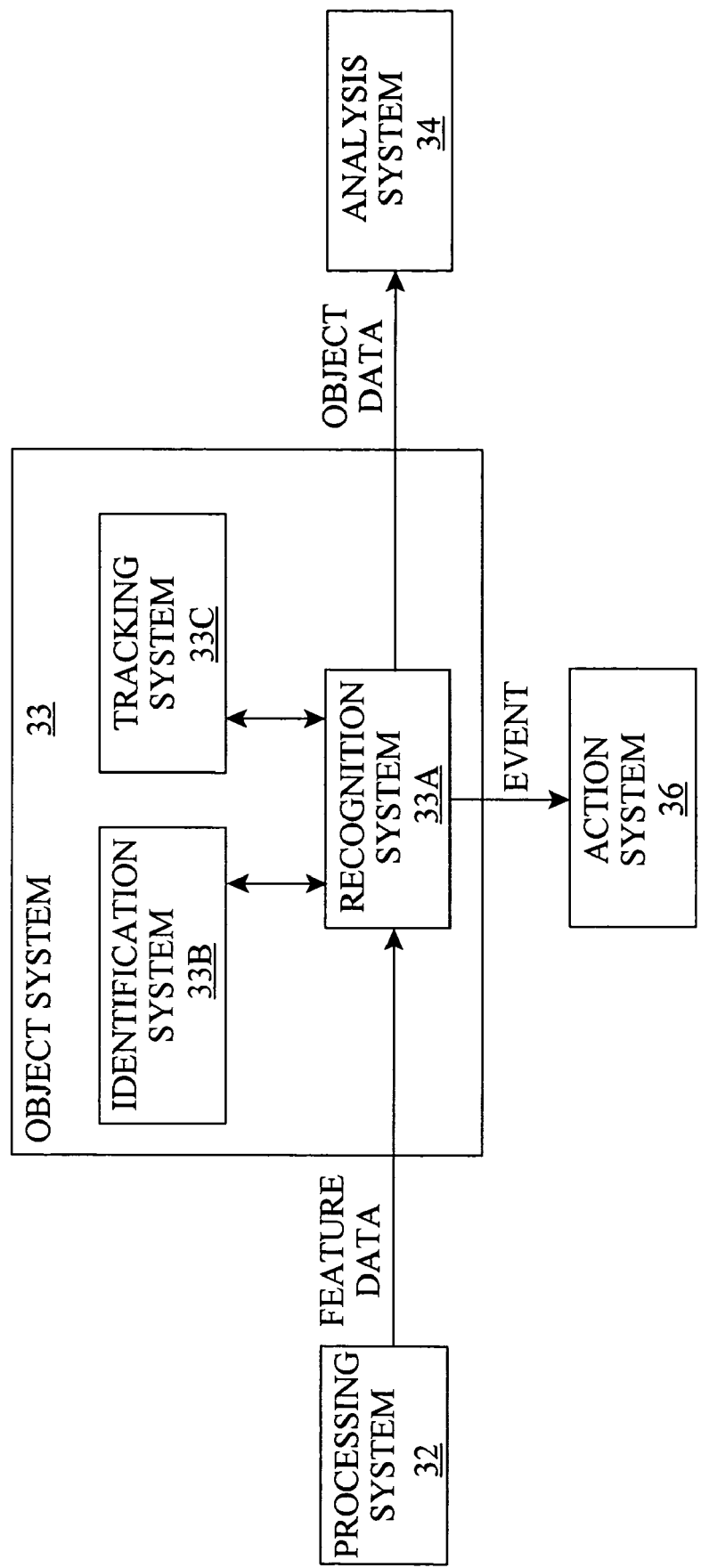
FIG. 4 shows an illustrative data flow diagram for one embodiment of the object system shown in FIG. 1.

FIG. 4 shows an illustrative data flow diagram for one embodiment of object system 33. As shown, recognition system 33A can receive the feature data from processing system 32 and generate object data based on the feature data. In particular, recognition system 33A automatically recognizes object(s) based on the features in the feature data. An object comprises a unified signal phenomenon. To this extent, an object can comprise a continuous entity that comprises one or more common characteristics based on the feature data. For example, an object can comprise an individual, a sound source, a movable inanimate object such as a briefcase, a car, a seat, etc. Recognition system 33A can implement any known solution for recognizing objects such as segmentation, template matching, etc.

The recognized object(s) can be provided as object data, which includes a listing of each object as a blob/description. For example, a type for each object can be determined by defining a bounding box area (area required to enclose the object), an aspect ratio (ratio of height to width), an extrema (number of extensions), and a solidarity (ratio of actual area versus bounding box area) for the object. These values can be compared to a table of values or the like to determine the type of object (e.g., adult, child, dog, vehicle, etc.) based on these values.

The object description also can describe one or more characteristics of the object (e.g., a compound object that comprises two or more objects), a type of object (e.g., animate/inanimate), etc. For example, in light data, an object could comprise a human being present in the monitored area. Further, another object could comprise a briefcase being carried by the individual. While being carried, the individual and the briefcase can be listed as a single compound object. However, when the briefcase is not being held by the individual, the compound object can be split into two separate objects (e.g., the individual and the briefcase).

Further, identification system 33B can identify an individual and/or other types of objects that are present in the monitored area. In this case, identification system 33B can incorporate a plurality of passive identification solutions and fuse the results to obtain a reliable identification for each individual. For example, several passive identification solutions can be implemented that identify an individual based on light data and/or sound data such as deformable templates, direct feature matching, etc. Illustrative identification solutions using light data include facial feature identification, vein pattern identification (e.g., on the back of a hand), clothing, a build (e.g., height, body proportion, etc.), one or more mannerisms, etc., of the individual. An illustrative identification solution using sound data comprises voice printing.

In any event, two or more identification solutions can be implemented by identification system 33B to obtain a plurality of preliminary identifications based on object data for the individual. Subsequently, the preliminary identifications can be fused to obtain a more reliable identification of each individual. For example, identification system 33B can obtain a preliminary identification of the individual based on facial features and a second preliminary identification based on a voice print. The two preliminary identifications can be fused to obtain a more reliable identification of the individual/object. Additionally, the final identification can be compared to identification information from an external database (e.g., database of employees, wanted list, etc.) to determine if the presence of the individual is authorized.

Still further, tracking system 33C can automatically track the movement of the recognized object(s). For example, an object can be recognized and followed throughout the monitored area, a source object of an event can be characterized and the location determined, etc. For light data, corresponding pixels in consecutive images can be compared to determine if a threshold difference between the pixels is present. By exceeding the threshold difference, movement is detected while slight changes due to varying light intensity can be successfully ignored. To this extent, tracking system 33C can implement one or more Hidden Markov Models, Kalman Filtering, and the like to determine various object spatial/temporal/signal characteristics. These characteristics (e.g., speed, trajectory, etc.) can be included with the object description as part of the object data.

One or more of the systems 33A-C shown in object system 33 can detect an event based on the object data. For example, based on its characteristics, an object could be recognized as a weapon such as a knife or gun, an individual present in a restricted area, an unauthorized individual, an object traveling at an excessive speed, a single object (e.g., an automobile) becoming two or more objects (e.g., individual exiting the automobile), etc. In this case, object system 33 can provide the event to action system 36 for further processing described below. Regardless, the object data is provided to analysis system 34 for further analysis.

Figure 5:
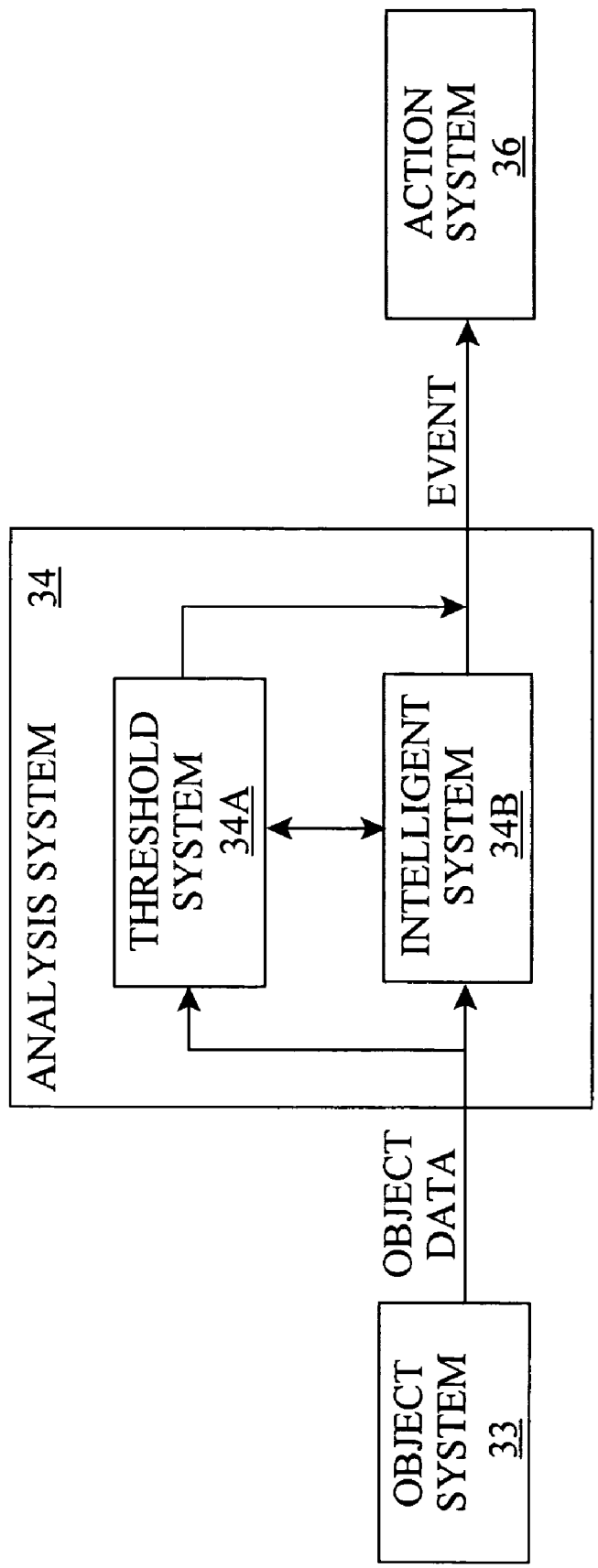
FIG. 5 shows an illustrative data flow diagram for one embodiment of the analysis system shown in FIG. 1.

FIG. 5 shows an illustrative data flow diagram for one embodiment of analysis system 34. Various events can be detected by analysis system 34. For example, analysis system 34 can recognize an individual threatening another individual (e.g., shouting combined with threatening motions). To this extent, analysis system 34 can implement one or more solutions for detecting events based on the object data. For example, the object data can be provided to a threshold system 34A that performs threshold analysis on the object data to detect an event. The threshold analysis can detect an event based on slope/peak/frequency characteristics of sound data, detect a region of interest (e.g., area where access by an individual is prohibited) violation, etc. Further, the object data can be provided to an intelligent system 34B that detects events using one or more intelligence-based solutions such a Hidden Markov Model, a neural network, a pooled optimal mixture model (POMM), and the like. It is understood that the illustrative systems 34A-B shown in analysis system 34 will be configured to detect events based on a particular monitored area as is known in the art. To this extent, intelligent system 34B can be "trained" to detect relevant events for the particular application. Regardless, each detected event is provided to action system 36 for further processing.

Figure 6:
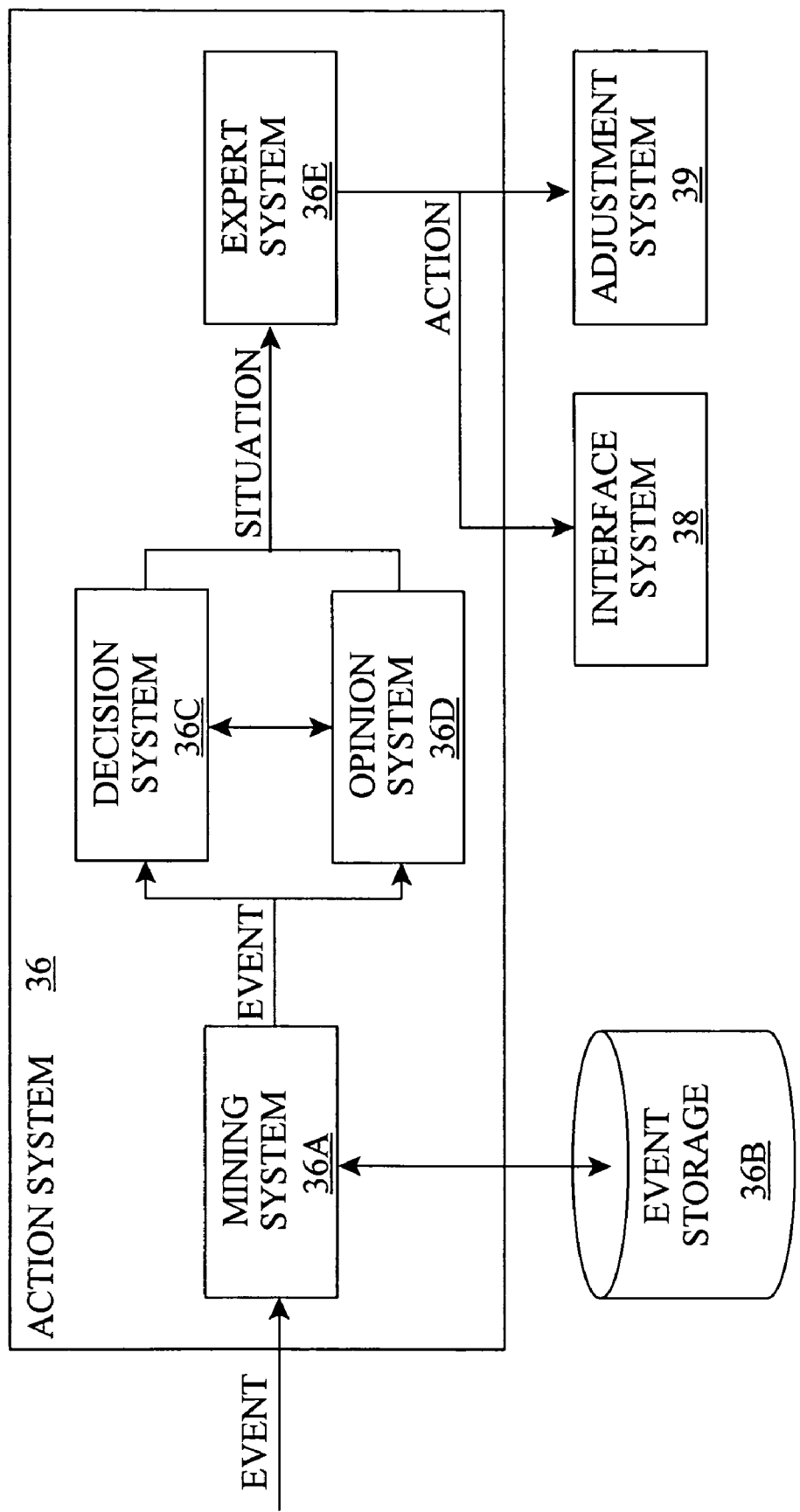
FIG. 6 shows an illustrative data flow diagram for one embodiment of the action system shown in FIG. 1.

FIG. 6 shows an illustrative data flow diagram for one embodiment of action system 36. In general, action system 36 receives event(s) from one or more of the previous systems as discussed herein, and automatically determines one or more actions based on the detected event(s). In one embodiment, action system 36 includes a mining system 36A, which manages a set of previous events stored in event storage 36B. In particular, mining system 36A can receive an event and store it in event storage 36B. Subsequently, mining system 36A can mine the previous events stored in event storage 36B to determine one or more additional events. To this extent, mining system 36A can detect a temporal event based on one or more previous events. For example, mining system 36A may store an event in event storage 36B that comprises an individual entering a restroom. When mining system 36A determines that an event that corresponds to the individual exiting the restroom has not occurred after an extended period of time, an event can be generated. Similarly, mining system 36A can maintain an event state, detect emerging trends, etc., based on previous event(s) stored in event storage 36B.

In any case, events are provided to a decision system 36C and/or an opinion system 36D. Decision system 36C can identify a situation based on one or more decision-based classifications such as majority voting, ranked lists, etc. Similarly, opinion system 36D can identify a situation based on one or more opinion-based classifications such as complex weighted summation, post-classifiers, weighted products, etc. Each system 36C-D can fuse one or more events and/or one or more situations identified by either system 36C-D into a single situation. Regardless, each situation is provided to expert system 36E for further processing.

Expert system 36E determines an action based on the event(s) and/or situation(s). To this extent, expert system 36E can comprise any type of decision-making system such as a neurofuzzy expert system. For example, expert system 36E can implement one or more rule-based expert systems that comprise rules derived from experts in a particular field, fuzzy logic systems that use assigned probabilities to weigh several possible alternatives, and/or other neural network systems that can be trained to respond to varying types of situations. Regardless, expert system 36E can compare the situation/event with a knowledge base of actions that can be taken in response and request one or more actions based on the situation/event. In particular, the action can be provided to interface system 38 for implementation and/or adjustment system 39 for automatic monitoring and analysis of the situation identification and response as discussed further below.

Figure 7:
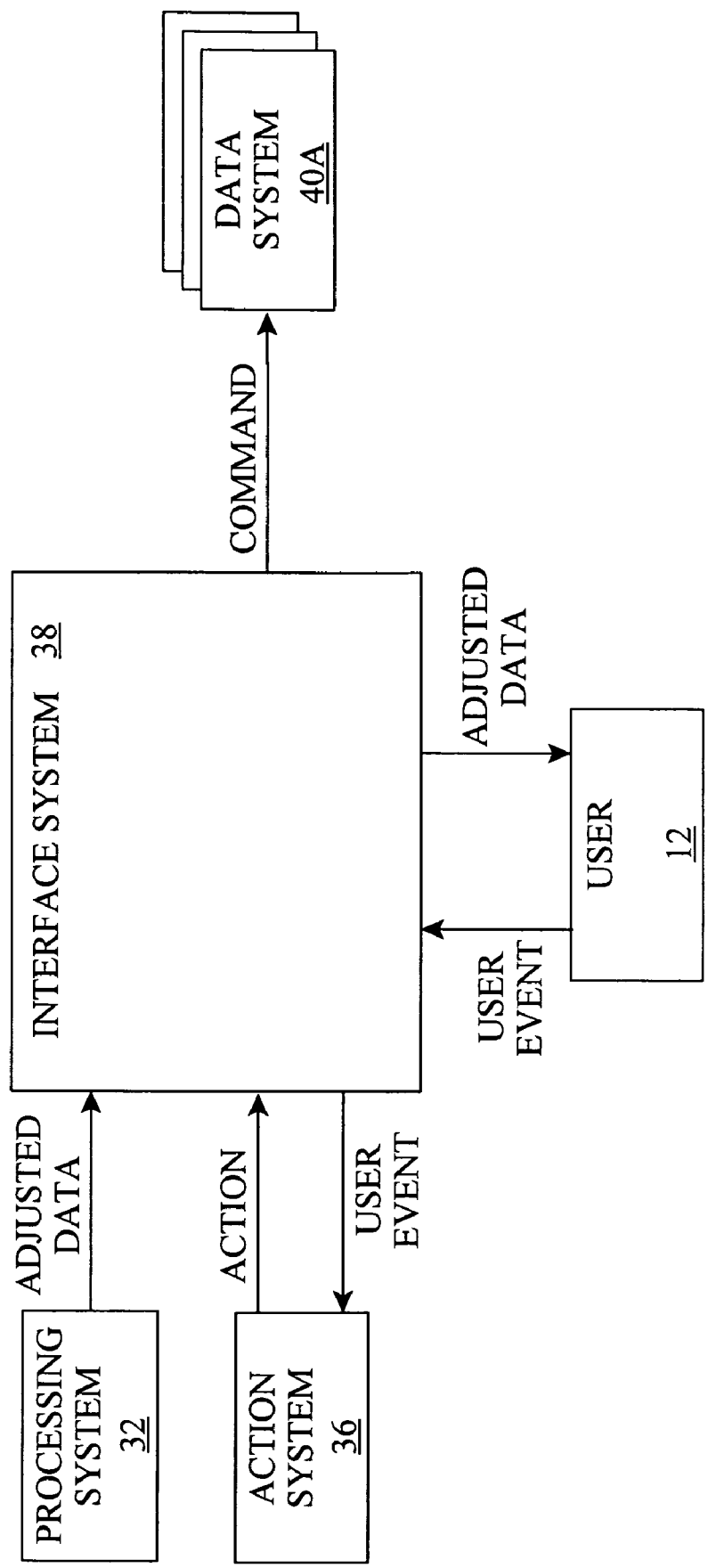
FIG. 7 shows an illustrative data flow diagram for one embodiment of the interface system shown in FIG. 1.

FIG. 7 shows an illustrative data flow diagram for one embodiment of interface system 38. As discussed above, interface system 38 can receive adjusted data from processing system 32 (e.g., modification system 32A of FIG. 3), and action(s) from action system 36 (e.g., expert system 36E of FIG. 6). In response to a received action, interface system 38 automatically performs the action. For example, interface system 38 can provide some/all of the adjusted data to user 12. To this extent, interface system 38 can filter/fuse the adjusted data for presentation to user 12 in an efficient and effective manner. In particular, adjusted data, such as background light data, that is not relevant to a particular situation can be removed, while other adjusted data, such as a particular voice, that is most relevant can be emphasized. Additionally, interface system 38 can generate alert sounds or the like to warn user 12 of a particular situation as is known in the art.

Further, interface system 38 can receive a user event generated by user 12. In this case, the user event could comprise the activation of an emergency button, a request to initiate the communication of some/all of the adjusted data for the monitored area, etc. In any event, interface system 38 can provide the user event to action system 36 for processing as discussed above. Still further, interface system 38 can perform one or more adjustments to one or more of the data systems such as data system 40A. For example, an action could comprise obtaining more detailed data for a particular region of the monitored area. In this case, interface system 38 can communicate one or more commands to the appropriate data system(s) 40A to adjust the corresponding data obtained by the data system(s) 40A.

Figure 8:
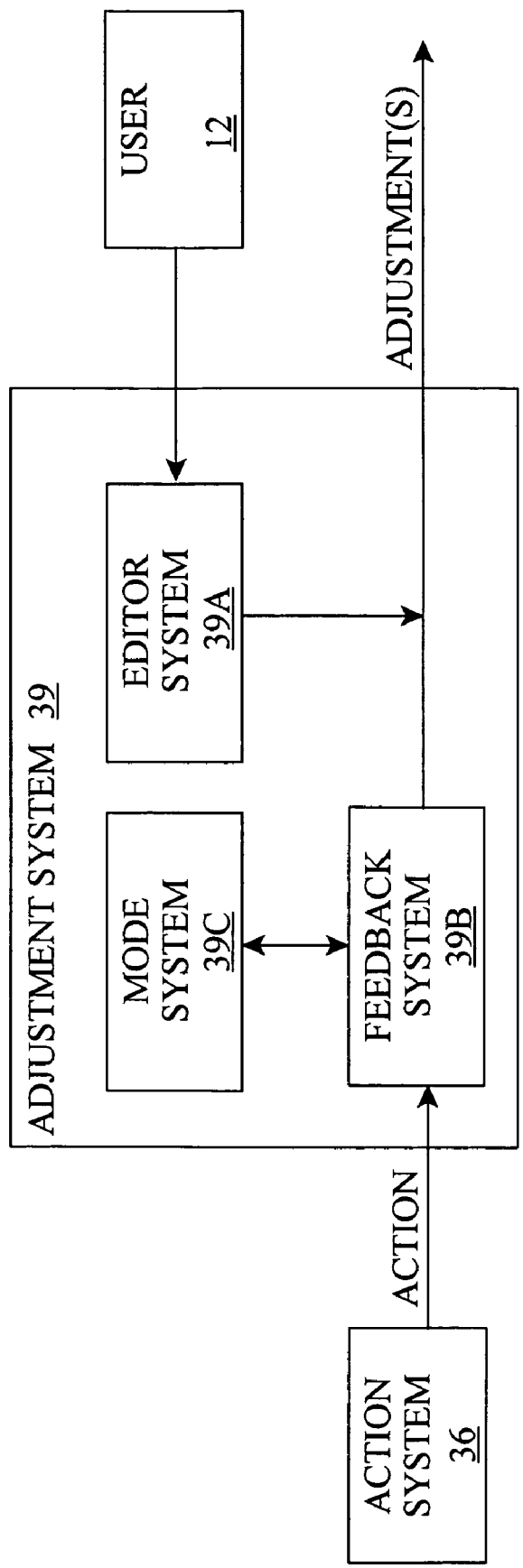
FIG. 8 shows an illustrative data flow diagram for one embodiment of the adjustment system shown in FIG. 1.

Returning to FIG. 2, adjustment system 39 can perform one or more adjustments to the various systems in system 10 (FIG. 1). FIG. 8 shows an illustrative data flow diagram for one embodiment of adjustment system 39. In particular, adjustment system 39 can include an editor system 39A that enables user 12 to manually adjust the operation of the various systems. In one embodiment, editor system 39A enables user 12 to manage (e.g., add, remove, adjust, train, retrain, etc.) one or more rules/algorithms and/or one or more parameters used by the rules/algorithms in order to adjust the operation of system 10. For example, user 12 may adjust one or more parameters based on a current need, situation, application, etc. Similarly, user 12 can add a rule to implement new desired functionality based on an application, remove a rule that implements unnecessary functionality, replace a rule with an improved rule, etc. This enables user 12 to selectively configure system 10 with newly available algorithms, custom algorithms for a specific implementation, and the like, in a "plug-in" fashion.

To this extent, monitoring system 30 (FIG. 1) can define, store, and access the various rules and their corresponding parameters in a database of object definitions. In this case, each object definition can comprise a rule with the corresponding parameters that implements some functionality at one or more of the various levels (e.g., feature, object, event, situation). As a result, editor system 39A can comprise a processing level editor allows user 12 to manage one or more noise models, filter selection, weight and outlier criteria, etc., used by processing system 32 (FIG. 2) to generate the adjusted data. Similarly, editor system 39B can comprise a feature level editor that allows user 12 to manage one or more templates, model approaches, selected filters, weight matrices, etc., used by processing system 32 to generate the feature data. An object level editor can also be included in editor system 39B to enable user 12 to manage one or more similar solutions that may be implemented by object system 33 (FIG. 2).

Editor system 39B can include various other editors that allow user 12 to make one or more adjustments to additional systems. For example, editor system 39B can include an analysis level editor that allows user 12 manage threshold value(s), selected algorithm(s), neural network(s), etc., used by analysis system 34 (FIG. 2). Further, editor system 39B can include an action level editor that allows user 12 to manage one or more fusion weights, rank structures, priorities, weight matrices, expert system rule(s), neural network(s), etc., that can be implemented by action system 36 (FIG. 2). Still further, editor system 39B can include an area layout editor that enables user 12 to define/modify one or more regions of interest, define/modify an importance for a particular physical feature within the monitored area, etc., independent of any particular rule/algorithm. These settings can then be used by the various systems when processing data while monitoring the area.

Further, adjustment system 39 can include a feedback system 39B that monitors one or more aspects of the various systems based on feedback from previous performance metrics and automatically adjusts the rules and/or parameters to improve the accuracy of one or more of the systems as is known in the art. Still further, adjustment system 39 can include a mode system 39C that can adjust the behavior of one or more of the various systems based on a mode of operation. For example, mode system 39C can adjust the operation of object system 33 (FIG. 2) between a learning mode and an active mode. In this case, object system 33 can use the feature data and object data generated for a particular object during the learning mode to train a neural network or the like. Subsequently, during the active mode of operation, object system 33 can use the neural network in subsequently recognize objects and/or detect events based on the feature data and object data generated during the active mode of operation.

Mode system 39C can also alter the mode of operation of only various aspects of one or more of the systems. For example, when recognition system 33A (FIG. 4) recognizes a new human object (e.g., individual), mode system 39C can adjust operation of identification system 33B (FIG. 4) to learn the individual's identification. In this case, the various features of the individual can be used to train a neural network or the like that is subsequently used to identify (e.g., distinguish) the individual among numerous individuals. After obtaining sufficient data (e.g., neural network is trained), mode system 39C can alter the mode of operation for identification system 33B to an active mode, during which the individual's identity is confirmed based on newly acquired feature and/or object data.

Further, mode system 39C can adjust operation of one or more of the various systems, such as action system 36. To this extent, a current mode of operation for action system 36 can be altered based on a detected event/situation. In particular, in response to an event that is detected in one mode (e.g., elevation changing for an aircraft in a takeoff mode), mode system 39C can alter the current mode (e.g., to an in flight mode). As a result, one or more parameters that alter the operation of action system 36 can be adjusted/changed based on the mode to effect the desired behavior. For example, an event/situation that occurs in one mode may be normal, while the detection of the same event/situation in another mode may require action. For an aircraft, mode system 39C could change the monitoring operation based on whether it is in flight, taking off, taxiing, being serviced, being loaded, etc. In this case, action system 36 will generate a different response to the sound of a drill during servicing as opposed to during flight. Similarly, the loss of data from a data system 40A-C (FIG. 1) may be treated differently based on the mode of operation for one or more of the systems.

Figure 9:
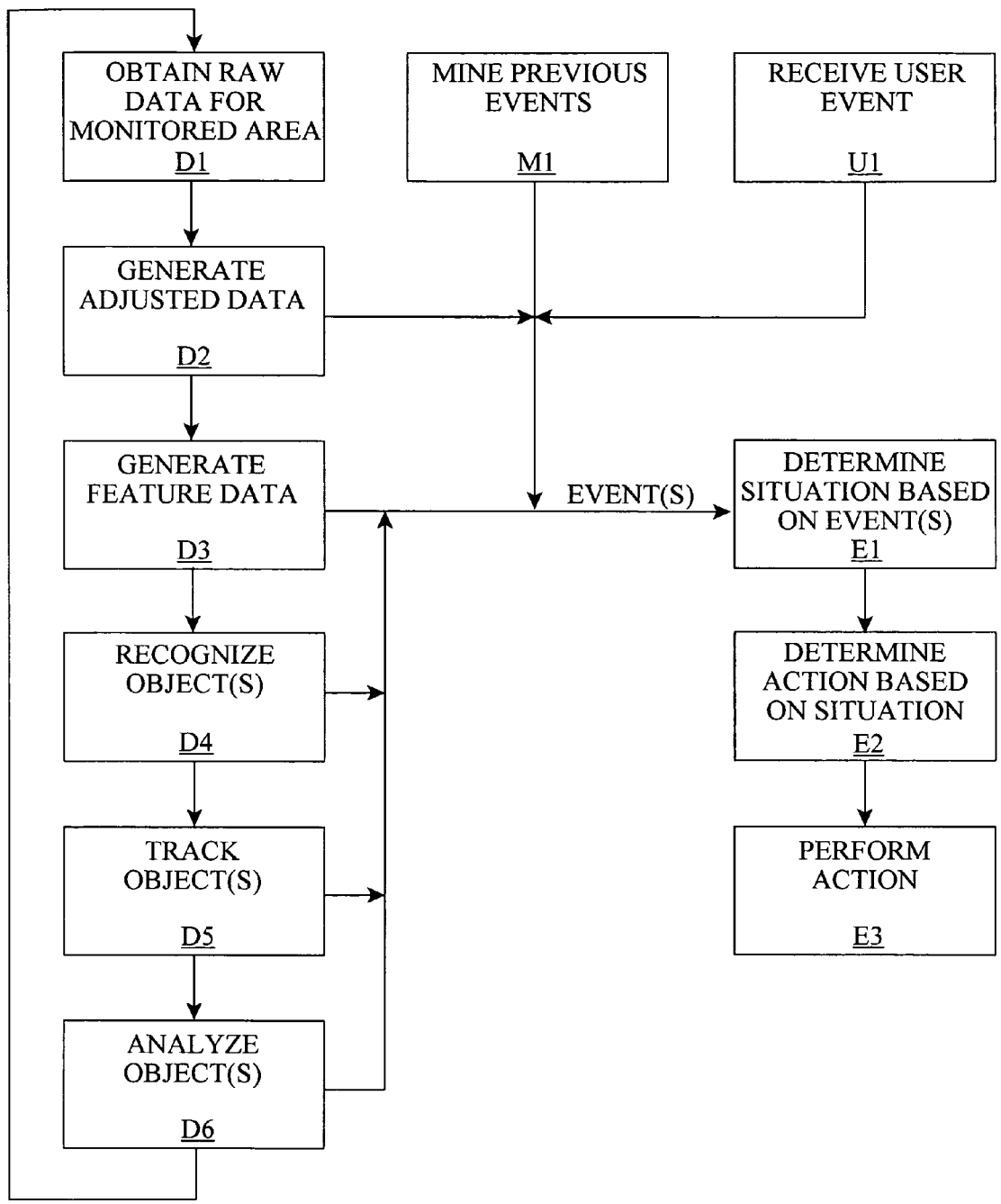
FIG. 9 shows illustrative method steps according to one embodiment of the invention.

FIG. 9 shows illustrative method steps according to one embodiment of the invention that can be implemented by the various systems as described above. In step D1, raw data for a monitored area is obtained from, for example, a plurality of sensing devices. In step D2, adjusted data is generated based on the raw data, and in step D3, feature data is generated based on the adjusted data. In step D4, one or more objects are recognized based on the feature data, and in step D5, the location/movement of the recognized object(s) are tracked. In step D6, the object data is analyzed before returning to step D1. As shown, at any of steps D2-D6, an event can be detected. Further, in step M1, one or more previous events can be mined to possibly detect an event, and in step U1, a user event can be received. Each event obtained from any of these steps is also processed. In particular, in step E1, a situation is determined based on one or more events. In step E2, a corresponding action, if any, is determined based on the situation/event, and in step E3, the action, if any, is performed. It is understood that FIG. 9 is only illustrative. To this extent, one or more of the various steps can be removed, skipped, merged, and/or performed simultaneously, additional steps can be included, etc.

Returning to FIG. 1, monitoring system 30 can be implemented in many types of environments. To this extent, system 10 can comprise a portable system that can be temporarily set up in any desired location to monitor, for example, a particular event (e.g., a street fair). Further, computer 14 and/or data systems 40A-C can comprise a battery or other type of power backup to continue operating for a period of time in the event of loss of power from a main power source. Still further, some or all of system 10, such as storage system 29 and/or memory 22, can comprise non-volatile storage that can maintain data on the monitored area without power. In this case, system 10 would provide some ability to perform post-event analysis due to a severe event (e.g., explosion).

Figure 10:
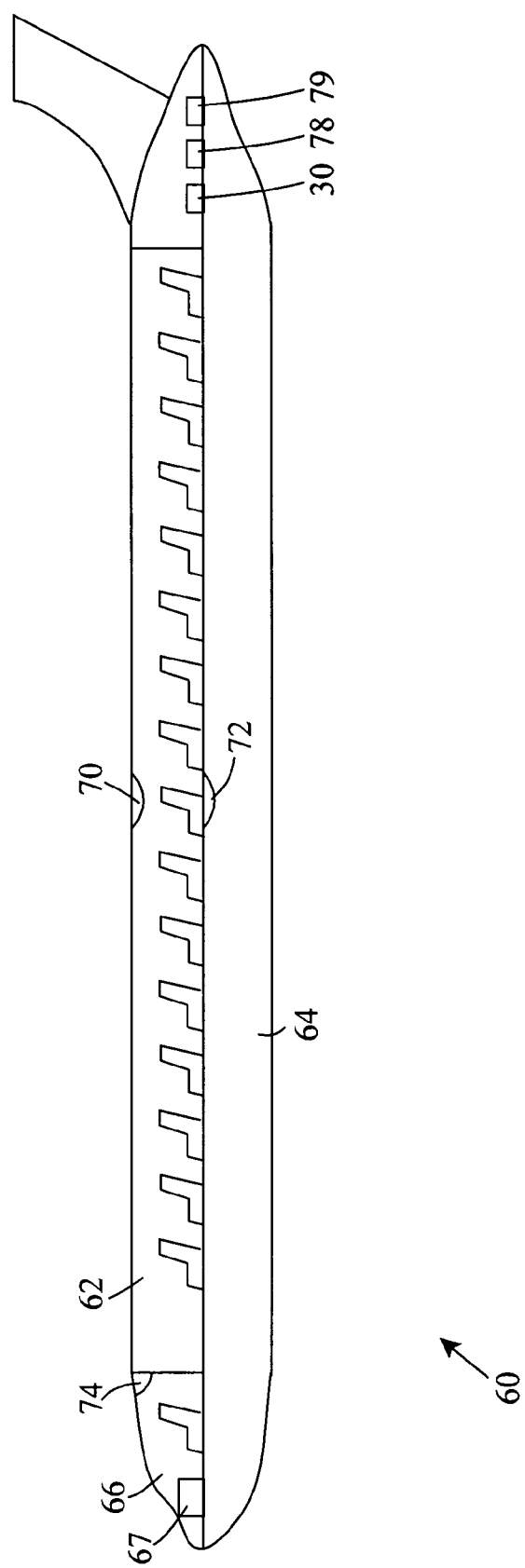
FIG. 10 shows a side view of an aircraft including one embodiment of the monitoring system.
Figure 11:
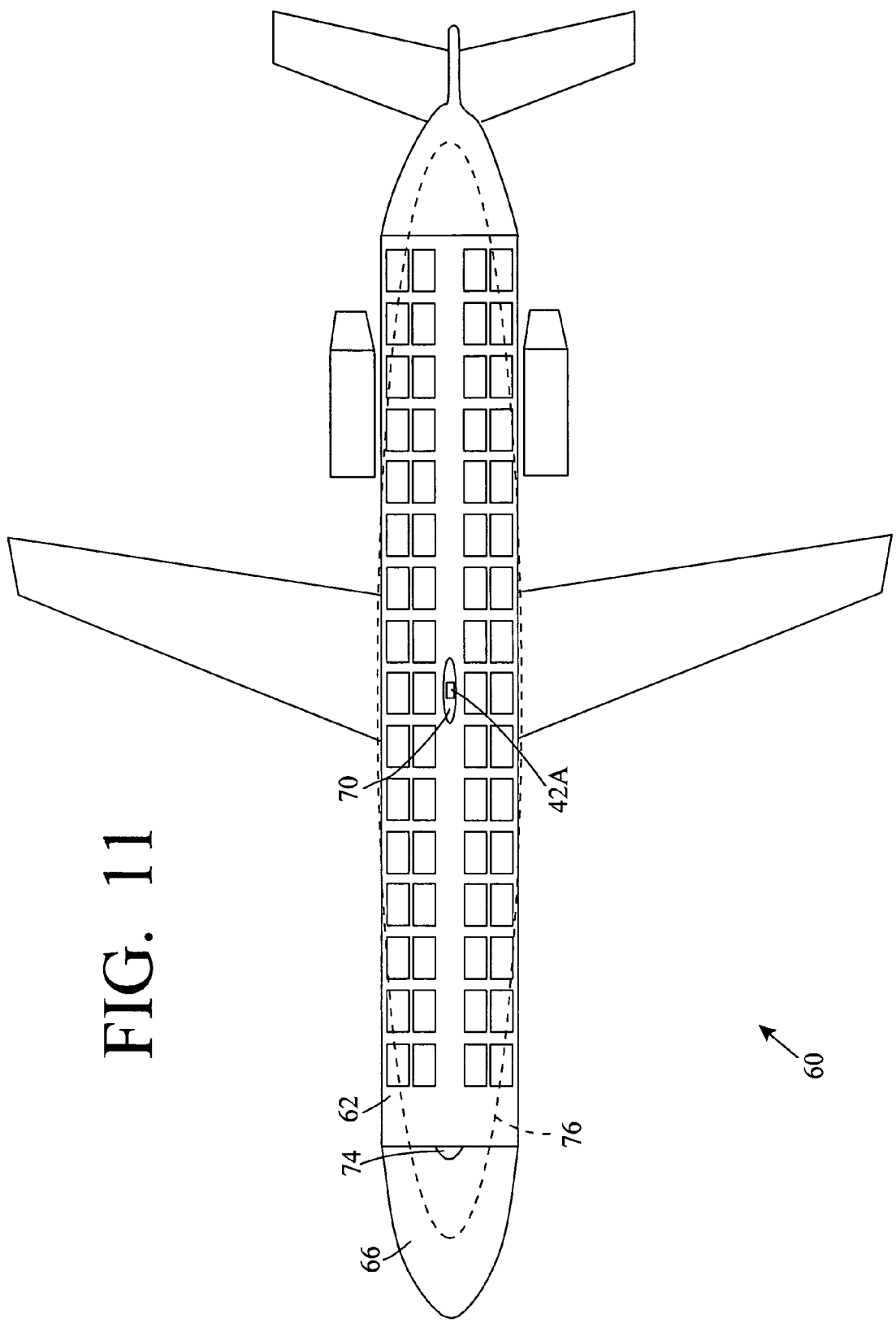
FIG. 11 shows a top view of the aircraft shown in FIG. 10.

An illustrative application for system 10 is shown in FIGS. 10 and 11, in which system 10 (FIG. 1) is implemented to monitor an aircraft 60. Aircraft 60 can comprise any type of aircraft. For example, aircraft 60 can be used primarily to transport passengers, transport cargo, recreation, or the like. However, aircraft 60 is only illustrative of various vehicles that can be monitored using system 10. For example, one or more areas of a car, a bus, a ship, a train, another type of aircraft (e.g., jet, cargo carrier, space shuttle), a truck, etc., can be monitored using the invention. Further, system 10 can be used to monitor any public area, such as an airport, a stadium, an office building, a hotel, etc., or private area, such as a house, an apartment, and the like. In any case, user 12 (FIG. 1) can comprise an individual located near/in the monitored area (e.g., a responder such as a pilot or an air marshal in aircraft 60) or remote from the monitored area (e.g., an air traffic controller).

As is known, aircraft 60 typically includes a passenger area 62, a storage area 64, and a control area 66 that comprises a control system 67 for operating aircraft 60. As shown, monitoring system 30 can be located in a tail section of aircraft 60 similar to a flight data recorder 78 and/or a cockpit voice recorder 79 to increase a likelihood of recovery in the case of an accident. In one embodiment, monitoring system 30 can take over operation of aircraft 60 during a particular emergency situation (e.g., pilot unavailable, collision avoidance, etc.). To this extent, interface system 38 (FIG. 7) can send one or more commands to control system 67 to maintain control of aircraft 60.

In another embodiment, monitoring system 30 is located remotely from aircraft 60, such as at a ground station. Alternatively, an additional system can be located at the ground station, which can communicate with monitoring system 30 on aircraft 60. In either case, a user 12 (FIG. 1) at the ground station can monitor activity in aircraft 60, and if necessary, obtain control of aircraft 60. Control of aircraft 60 can be obtained using monitoring system 30, or monitoring system 30 could activate another system, such as the Protected Asset Flight System (PAFS) proposed by NASA, to control aircraft 60. Still further, user 12 could use monitoring system 30 to assist in controlling an unmanned aircraft 60 by analyzing the environment of aircraft 60 independent of user 12. In any event, monitoring system 30 can receive data from data systems 40A-C (FIG. 1) and communicate data to data systems 40A-C and/or control system 67 using any known wireless communications. Further, each message can be encrypted and comprise a timestamp, electronic watermark, and/or other data that can be used to verify authenticity, verify an event sequence, etc.

In one embodiment, communications between aircraft 60 and a remote system (e.g., monitoring system 30) use existing transmission capabilities on aircraft 60 such as an air phone, etc. However, these transmission capabilities typically comprise a low-bandwidth link. As a result, the data desired to be communicated, such as the adjusted data described above, may exceed these bandwidth capabilities. To this extent, communications between aircraft 60 and the ground station can be compressed using any known solution. For example, interface system 38 (FIG. 7) and/or data systems 40A-C (FIG. 1) can perform wavelet compression or the like, on the adjusted data prior to communicating it to the remote system. Additionally, interface system 38 and/or data systems 40A-C can define one or more regions of interest (ROIs) in the data. In this case, interface system 38 and/or data systems 40A-C can discard irrelevant information, summarize events, etc., before communicating the data.

It is understood that data systems 40A-C (FIG. 1) and/or their corresponding sensing devices 42A-C (FIG. 1) can be sold and/or installed independently of monitoring system 30. To this extent, monitoring system 30 can be installed and implemented using pre-existing sensing devices 42A-C and/or data systems 40A-C. For example, monitoring system 30 can receive and analyze data using some or all of the various sensing systems currently implemented on aircraft 60 or added subsequently to aircraft 60 independent of monitoring system 30.

For example, some or all of attribute data system 40C (FIG. 1) could comprise various attribute sensing devices 42C (FIG. 1) currently installed and used on a typical aircraft 60. Each attribute sensing device 42C can comprise any type of sensing device capable of generating and/or obtaining attribute data for a particular monitored area, e.g., passenger area 62, and/or attribute data for the entire vehicle/public area, e.g., aircraft 60. Attribute data for aircraft 60 can comprise a speed, a geographic location, a pitch, an altitude, an acceleration, a stress/vibration at one or more locations, a direction of travel, a heading, a weight distribution, a landing gear status, a fuel level, etc. For example, current monitoring systems are typically installed on aircraft 60 for obtaining and providing various data on aircraft to flight data recorder 78 and/or cockpit voice recorder 79. In this case, less hardware would be required to monitor the various attributes, thereby reducing the amount of weight added to aircraft 60 by including support for monitoring system 30.

However, one or more of data systems 40A-C (FIG. 1) and/or sensing devices 42A-C (FIG. 1) can be implemented along with monitoring system 30. For example, monitoring system 30 can monitor passenger area 62 based on data obtained from various sensing devices 42A-C installed on a sensor head 70. Attribute data for passenger area 62 can include, for example, a temperature, a pressure, air quality/content, etc. Further, attribute data for passenger area 62 can comprise data regarding the presence of one or more harmful agents such as a biological or chemical agent, radiation, carbon monoxide, and the like. In these cases, the various attribute sensing devices 42C (FIG. 1) could be installed on sensor head 70.

In one embodiment, sensor head 70 is mounted to a ceiling of passenger area 62 in any known manner and is located at an approximate center of the length and width of passenger area 62. In this position, data such as sound data and light data can be efficiently captured for the entire passenger area 62 using sensor head 70 as discussed further below. However, it is understood that various locations and/or multiple sensor heads 70 can be implemented based on the particular application and/or desired data. For example, multiple sensor heads 70 could be used for passenger area 62 when a first class area may be curtained off, to obtain facial data for all passengers during the flight, etc. Further, aircraft 60 can include a second sensor head 72 for obtaining data for storage area 64, and a third sensor head 74 for obtaining data for control area 66. It is understood that, similar to sensor head 70, sensor heads 72, 74 can also be mounted in any desired location and/or any known manner, and the locations shown are only illustrative.

In one embodiment, each sensor head 70, 72, 74 comprises one or more light sensing devices 42A (FIG. 1) and/or one or more sound sensing devices 42B (FIG. 1) for obtaining data for the respective areas 62, 64, 66. Each sensing device 42A-B comprises any type of device capable of capturing and/or generating data on the monitored area and communicating the data to a computing device (e.g., computer 14 of FIG. 1). For example, light sensing device 42A can comprise a video camera, an infrared camera, etc., that can obtain one or more images of the monitored area. Similarly, sound sensing device 42B can comprise a microphone or the like capable of capturing audible and/or inaudible sounds in the area.

Figure 12B:
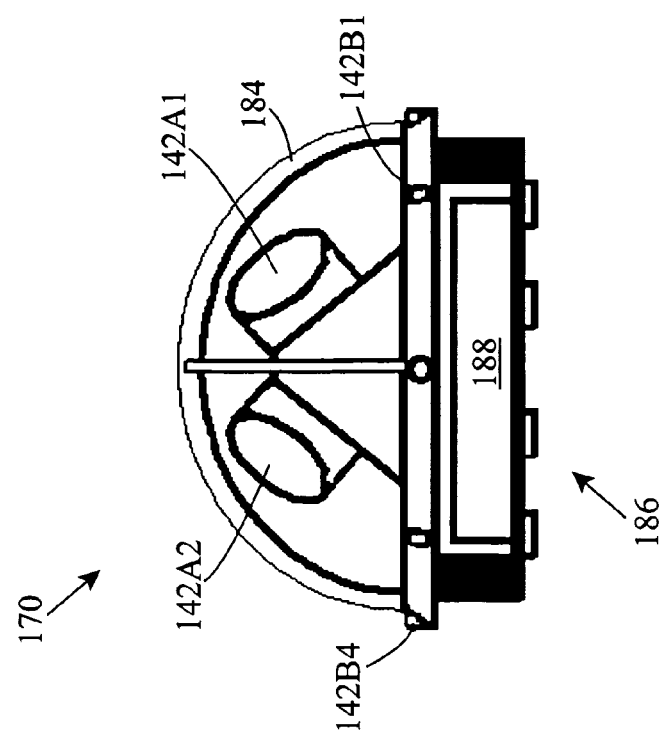
FIG. 12B shows a side view of the sensor head shown in FIG. 12A.
Figure 12A:
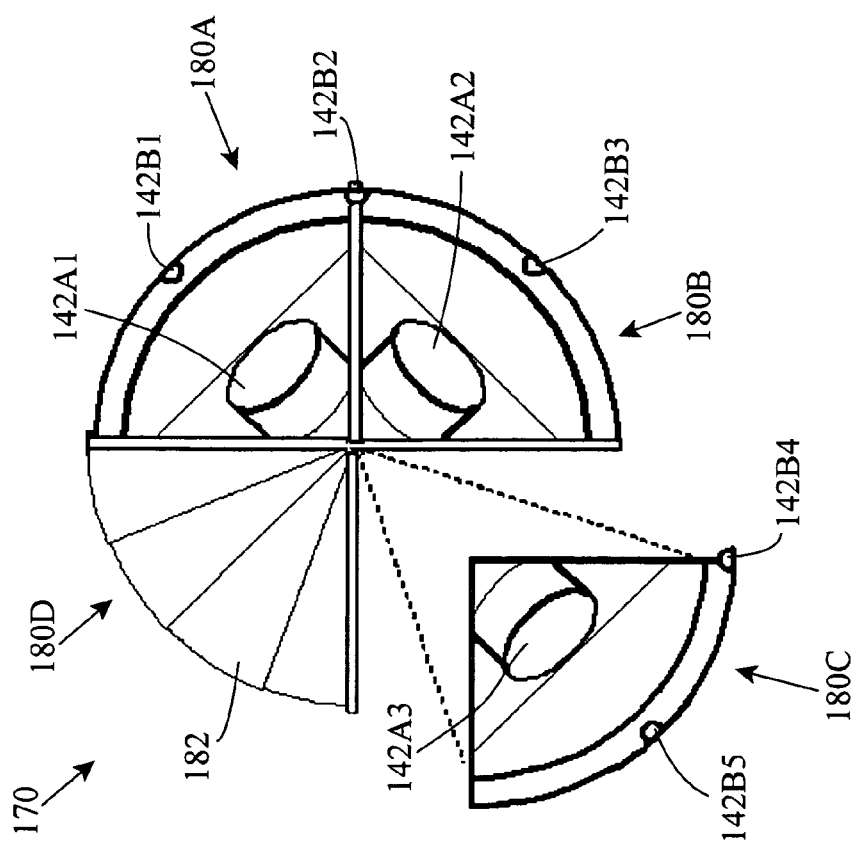
FIG. 12A shows a top view of an illustrative sensor head according to one embodiment of the invention.

For example, FIGS. 12A-B show a top view and a side view, respectively, of an illustrative sensor head 170. As shown in FIG. 12A, sensor head 170 comprises a plurality of light sensing devices (e.g., cameras) 142A1-3 and an array of sound sensing devices 142B1-5 (e.g., microphones). It is understood however, that a single light sensing device and/or a single sound sensing device could be incorporated in some applications.

In any event, sensor head 170 is shown including a plurality of combinable modules 180A-D that can be attached to form any desired shape for sensor head 170 (e.g., circular, half circle). For example, each module, such as module 180C, can comprise approximately one quarter of a circle and includes a light sensing device 142A3 and a plurality of sound sensing devices 142B4-5. In this case, each light sensing device 142A1-3 can comprise a field of view of approximately ninety degrees, and can comprise a specifically tailored optical device or a standard off-the-shelf device. Similarly, each sound sensing device 142B1-5 can comprise any type of off-the-shelf device. The use of modules 180A-D allows various configurations for sensor head 170 to be implemented. For example, as shown in FIG. 11, two modules could be used for sensor head 74, and four modules could be used for sensor head 70. As a result, modules 180A-D (FIGS. 4A-B) provide increased configuration flexibility while retaining the ability to reuse the same sensing devices.

In any event, sensor head 170 can include various additional components selected based on the application. For example, module 180D is shown including a plurality of protective shutters 182 that can be closed to protect sensing device(s) within module 180D from harmful elements, and automatically and/or manually opened to enable the proper functioning of the sensing device(s). Similarly, as shown in FIG. 12B, sensor head 170 can include a substantially transparent dome 184 comprising any appropriate material (e.g., glass, clear plastic, etc.) that provides protection to the sensing device(s) while allowing them to properly function.

It is understood that sensor head 170 can further include any required wiring or the like that enables each sensing device, e.g., light sensing devices 142A1-3 and sound sensing devices 142B1-5, to properly operate and/or communicate data to monitoring system 30 (FIG. 1). To this extent, sensor head 170 is shown including power/data connectors 186, and can include one or more preprocessing systems 188. Preprocessing system 188 can receive data from one or more of the various sensing devices and forward the data to computer 14 (FIG. 1) for further processing. Additionally, each preprocessing system 188 could perform one or more adjustments to the data prior to forwarding the data to computer 14. For example, preprocessing system 188 could perform one or more of the adjustments discussed above with respect to modification system 32A (FIG. 3), combine data received from multiple sensing devices (e.g., light sensing devices 142A1-3), etc.

Figure 13:
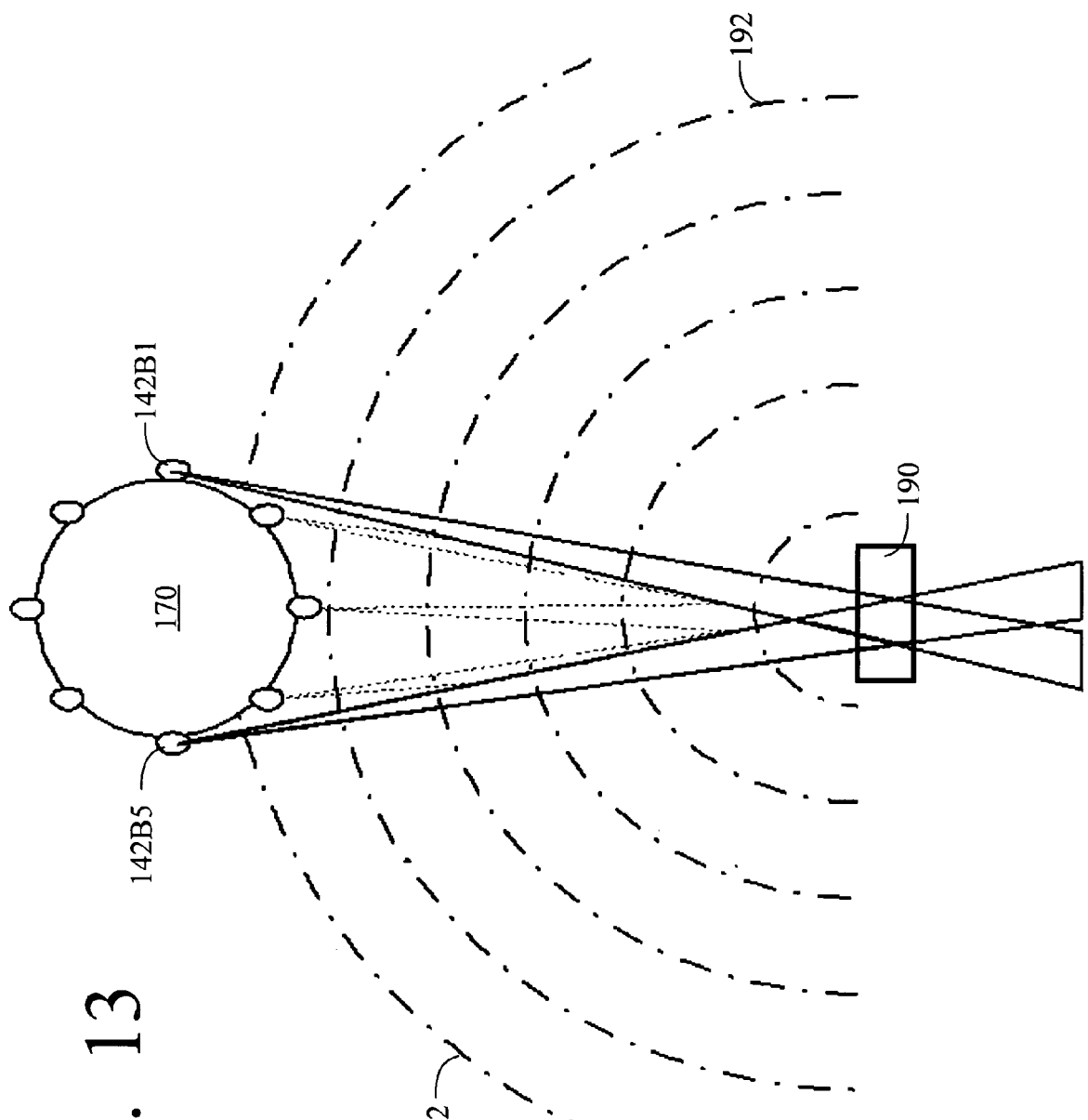
FIG. 13 illustrates localization of a sound generator using an array of sound sensing devices.

By using an array of sound sensing devices 142B1-5, a source object of sound data that is detected can be automatically determined and localized. For example, as shown in FIG. 13, a sound generator 190 may be physically present in the same area as sensor head 170. When the sound is generated, sound waves 192 radiate outwardly from sound generator 190 and are detected by, inter alia, sound sensing devices 142B1, 142B5. Subsequently, various techniques known by those in the art, such as beam forming, directional microphone design, etc., can be used to determine an area within which sound generator 190 is located.

Returning to FIG. 11, in order to monitor passenger area 62 using light data, it is both desirable to obtain light data for substantially all of passenger area 62 and to minimize the weight added to aircraft 60 due to the light sensing device(s) 42A. To this extent, sensor head 70 can comprise a single panoramic light sensing device 42A for obtaining light data for substantially all of passenger area 62. In this manner, the number of light sensing devices 42A is minimized (e.g., one) while the necessary light data is obtained. However, current panoramic light sensing devices have a circular field of view. That is, current panoramic solutions acquire image data evenly across all angles at a set radius from the light sensing device 42A. As a result, when a monitored area, such as passenger area 62, comprises an elongated region, imaging resources are wasted along the relatively close sides, while the light data typically lacks sufficient resolution along the longer distances.

To address the resolution problem, light sensing device 42A can comprise a field of view 76 that substantially conforms to passenger area 62. In this case, the resolution obtained on each side of passenger area 62 is reduced while the resolution along the length of passenger area 62 is increased. As a result, light sensing device 42A can obtain light data having sufficient resolution to recognize relevant objects in substantially all of passenger area 62. For example, light sensing device 42A can comprise an omnidirectional camera with specifically tailored optics to increase the effective coverage of passenger area 62 over that provided by standard optical approaches. To this extent, light sensing device 42A can comprise a specially designed combination of cylindrical lenses and mirrors, a specifically shaped mirror in a catadioptric arrangement similar to that of hyperbolic or parabolic mirrors currently used for panoramic imaging, or the like.

Additionally, when light data system 40A (FIG. 1) obtains light data using light sensing device 42A having field of view 76 or the like, light data system 40A and/or modification system 32A (FIG. 3) can adjust the light data by unwarping it. In particular, field of view 76 will generate an image having an elliptical shape. In this case, modification system 32A can readjust the elliptical shape to a rectangular shape that is more conducive for viewing by user 12 (FIG. 1).

It should be appreciated that the teachings of the present invention could be offered as a business method on a subscription or fee basis. For example, monitoring system 30 (FIG. 1) could be created, maintained and/or deployed by a service provider that offers the functions described herein for customers. That is, a service provider could offer to monitor an area as described above. It is understood that the present invention can be realized in hardware, software, a propagated signal, or any combination thereof. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized.

The present invention also can be embedded in a computer program product or a propagated signal, which comprises all the respective features enabling the implementation of the methods described herein, and which—when loaded in a computer system—is able to carry out these methods. Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A system for monitoring a vehicle, the system comprising:
   means for obtaining a first type of raw data for a passenger area of the vehicle, wherein the means for obtaining a first type of raw data includes a sensing device selected from the group comprising a light sensing device, an array of sound sensing devices, and attribute sensing devices;
   means for obtaining a second type of raw data for the passenger area, wherein the means for obtaining the second type of raw data includes a sensing device selected from the group comprising a light sensing device, an array of sound sensing devices, and attribute sensing devices;
   means for detecting an event based on at least one of the first type of raw data or the second type of raw data, wherein the means for detecting includes means for generating adjusted data based on the first type of raw data and the second type of raw data, wherein the adjusted data comprises at least some of the first type of raw data and at least some of the second type of raw data; and means for automatically determining an action based on the event.

2. The system of claim 1, wherein the light sensing device obtains light data, wherein the light data comprises sufficient resolution to recognize relevant objects in substantially all of the passenger area.

3. The system of claim 2, wherein the light sensing device comprises a field of view that substantially conforms to the passenger area.

4. The system of claim 1, further comprising means for mounting both the means for obtaining to the vehicle.

5. The system of claim 1, further comprising means for obtaining raw data for at least one of a control area, a storage area, or a second passenger area of the vehicle.

6. The system of claim 1, wherein the vehicle comprises an aircraft.

7. The system of claim 1, further comprising:
means for obtaining a plurality of modes of operation for the system;
means for setting one of the plurality of modes of operation as a current mode of operation for the system; and
means for altering the current mode of operation based on the event.

8. The system of claim 1, further comprising means for communicating the first type of raw data and the second type of raw data to at least one of a user at a location remote from the vehicle or a responder within the vehicle.

9. The system of claim 8, further comprising means for receiving a request to initiate the means for communicating.

10. The system of claim 8, wherein the action comprises initiating the means for communicating based on the event.

11. The system of claim 1, further comprising means for automatically performing the action.

12. The system of claim 1, wherein the means for detecting includes:
means for generating feature data based on the first type of raw data and the second type of raw data; and
means for generating object data based on the feature data.

13. The system of claim 12, wherein the means for detecting further includes means for automatically determining a source object for the event based on the object data.

14. The system of claim 12, wherein the means for detecting further includes:
means for applying a first identification solution to object data for an individual to determine a first preliminary identification of the individual;
means for applying a second identification solution to the object data to determine a second preliminary identification of the individual; and
means for fusing the first and second preliminary identifications to identify the individual.

15. A system for monitoring an area, the system comprising:
means for obtaining a first type of raw data for the area;
means for obtaining a second type of raw data for the area;
means for generating adjusted data based on the first type of raw data and the second type of raw data, wherein the adjusted data includes at least some of the first type of raw data and at least some of the second type of raw data; and
means for detecting an event based on the adjusted data.

16. The system of claim 15, further comprising means for automatically determining a source object for the event based on the adjusted data.

17. The system of claim 15, further comprising means for automatically determining an action based on the event.

18. The system of claim 17, wherein the means for automatically determining includes:
means for identifying a situation based on the event; and
means for determining the action based on the situation.

19. The system of claim 15, wherein the means for obtaining a first type of raw data comprises at least one camera, and wherein the means for obtaining a second type of raw data comprises an array of sound sensing devices.

20. The system of claim 15, wherein the means for detecting further includes:
means for applying a first identification solution to object data for an individual to determine a first preliminary identification of the individual;
means for applying a second identification solution to the object data to determine a second preliminary identification of the individual; and
means for fusing the first and second preliminary identifications to identify the individual.

21. The system of claim 15, further comprising:
means for obtaining a plurality of modes of operation for the system;
means for setting one of the plurality of modes of operation as a current mode of operation for the system; and
means for altering the current mode of operation based on the event.

22. The system of claim 15, further comprising means for communicating the adjusted data to a remote system.

23. The system of claim 15, wherein the means for generating adjusted data includes:
means for generating feature data based on the first type of raw data and the second type of raw data; and
means for generating object data based on the feature data.

24. The system of claim 23, wherein the means for detecting an event includes:
means for detecting the event based on at least one of the first or second types of raw data;
means for detecting the event based on the feature data; and
means for detecting the event based on the object data.

25. A system for monitoring an area, the system comprising:
means for obtaining raw data for the area;
means for generating object data for an individual in the area based on the raw data;
means for applying a first identification solution to the object data to determine a first preliminary identification of the individual;
means for applying a second identification solution to the object data to determine a second preliminary identification of the individual; and
means for fusing the first and second preliminary identifications to identify the individual.

26. The system of claim 25, further comprising means for detecting an event based on the identification.

27. The system of claim 25, further comprising means for learning an identification of the individual based on the object data.

28. The system of claim 27, further comprising means for selecting between the means for learning and the means for identifying.

29. The system of claim 25, further comprising means for determining an action based on the identification.

30. The system of claim 25, wherein the means for obtaining area data includes:
means for obtaining a first type of raw data for the area, wherein the first preliminary identification is based on object data for the individual based on the first type of raw data; and
means for obtaining a second type of raw data for the area, wherein the second preliminary identification is based on object data for the individual based on the second type of raw data.

31. A system for monitoring an area, the system comprising:
means for obtaining a plurality of modes of operation for the system;
means for setting one of the plurality of modes of operation as a current mode of operation for the system;
means for obtaining raw data for the area;
means for automatically detecting an event based on the raw data and the current mode of operation; and
means for altering the current mode of operation based on the event.

32. The system of claim 31, wherein the means for obtaining raw data comprises:
means for obtaining a first type of raw data for the area;
means for obtaining a second type of raw data for the area; and
means for generating adjusted data based on the first type of raw data and the second type of raw data, wherein the adjusted data comprises at least some of the first type of raw data and at least some of the second type of raw data.

33. The system of claim 31, further comprising means for determining an action based on the event.

34. The system of claim 33, further comprising means for automatically performing the action.

35. A system for monitoring an area, the system comprising:
means for obtaining raw data for the area, wherein the raw data comprises a plurality of types of data;
means for generating feature data based on the raw data;
means for generating object data based on the feature data; and
means for detecting an event based on at least one of the raw data, the feature data, or the object data.

36. The system of claim 35, further comprising means for adjusting at least one of the means for generating feature data, means for generating object data, or means for detecting an event.

37. The system of claim 35, further comprising means for determining an action based on the event.

38. The system of claim 37, further comprising means for automatically performing the action.

39. The system of claim 37, wherein the means for determining an action includes:
means for identifying a situation based on the event;
means for comparing the situation with a knowledge base of actions; and
means for selecting the action from the knowledge base of actions based on the situation.

40. The system of claim 35, wherein the means for generating feature data includes:
means for generating adjusted data; and
means for fusing the plurality of types of data.

41. The system of claim 35, wherein the means for generating object data includes:
means for recognizing an object based on the object data; and
means for tracking the object within the object data.

42. The system of claim 35, wherein the means for detecting an event includes:
means for performing a threshold analysis on the object data to detect the event; and
means for using a neural network to detect the event.

43. The system of claim 35, wherein the means for detecting an event includes means for mining a set of previous events.

* * * * *